United States Patent [19]
Rees et al.

[11] Patent Number: 5,265,693
[45] Date of Patent: Nov. 30, 1993

[54] INTEGRATED TRACTION CONTROL SYSTEM

[75] Inventors: Susan L. Rees, Clawson; Rimas S. Milunas, Rochester Hills; Larry T. Nitz, Troy; William J. Bolander, Clarkston, all of Mich.

[73] Assignee: Saturn Corporation, Troy, Mich.

[21] Appl. No.: 960,079

[22] Filed: Oct. 13, 1992

Related U.S. Application Data

[63] Continuation-in-part of Ser. No. 849,225, Mar. 9, 1992, abandoned.

[51] Int. Cl.$^5$ .............................................. B60K 28/16
[52] U.S. Cl. ........................... 180/197; 364/426.01; 364/424.1; 123/417
[58] Field of Search ................. 180/197; 364/426.01, 364/426.03, 424.1; 123/417, 416

[56] References Cited

U.S. PATENT DOCUMENTS

| | | | |
|---|---|---|---|
| 4,856,610 | 8/1989 | Leiber et al. | 180/197 |
| 5,047,940 | 9/1991 | Onaka et al. | 364/426.02 |
| 5,060,746 | 10/1991 | Nobumoto et al. | 180/197 |
| 5,083,479 | 1/1992 | Ito et al. | 180/197 |
| 5,184,577 | 2/1993 | Kato et al. | 180/197 |
| 5,201,383 | 4/1993 | Kitagawa et al. | 180/197 |
| 5,213,178 | 5/1993 | Polidan et al. | 364/426.03 |

FOREIGN PATENT DOCUMENTS

| | | |
|---|---|---|
| 0315205A3 | 11/1988 | European Pat. Off. |
| 0444910A2 | 2/1991 | European Pat. Off. |
| 0477082A3 | 9/1991 | European Pat. Off. |
| 0487078A1 | 11/1991 | European Pat. Off. |

Primary Examiner—Margaret A. Focarino
Assistant Examiner—Kevin Hurley
Attorney, Agent, or Firm—Howard N. Conkey

[57] ABSTRACT

A traction control system provides coordinated use of axle torque management via engine spark, engine fuel, and transmission gear ratio. Primary torque management is provided by retarding the ignition timing to reduce engine torque. When the spark retard reaches a determined limit value, the vehicle automatic transmission is upshifted which reduces axle torque and engine speed, thus reducing the amount of spark retard required to control a slip condition, thereby increasing the authority of the spark retard system. The limit spark retard threshold is established as a function of the temperature of the catalytic converter so as to prevent an overtemperature condition. Further, fuel control is ultimately used if control of ignition timing is incapable of bringing the acceleration slip under control. This condition may exist, for example, when the spark system authority of control is insufficient due to limitations placed upon its authority in response to a sensed hot catalytic converter condition.

4 Claims, 14 Drawing Sheets

INTEGRATED TRACTION CONTROL SYSTEM

This is a continuation-in-part of Ser. No. 07/849,225 filed Mar. 9, 1992 now abandoned.

BACKGROUND OF THE INVENTION

This invention relates to a vehicle traction control system and method.

Various traction control methods have been proposed for preventing an excessive slip condition of the driven wheels of a vehicle during vehicle acceleration by minimizing/optimizing the slip of the driven wheels. Such traction control systems can be classified into full feature systems with brake and engine torque management, engine torque only control systems, brake torque control only systems, and transmission gear ratio control.

Full feature traction control systems make use of a dedicated control module which modulates brakes and executes some form of engine torque management using spark, fuel or throttle control. These systems have excellent controllability but suffer from complexity and high hardware cost.

Engine torque management systems typically use fuel cutoff or throttle control as the primary control mechanism, with some spark trims to achieve torque reduction. While fuel control can be relatively smooth in a V6 or V8 engine with individual cylinder cutting, this method is particularly coarse if used on a throttle body injection or a simultaneous multi-point fuel injection system.

Brake control can be very quick acting, but searching the surface for traction with brake control often does not provide for smooth control. Furthermore, brake only systems usually require additional hardware which provides the capability of applying the brakes upon demand.

The challenge remains to devise a low cost, simple, and smooth traction control system utilizing existing control methods which are available in a highly integrated vehicle control system.

SUMMARY OF THE INVENTION

This invention provides for a smooth and cost-effective traction control system through the coordinated use of axle torque management via engine spark, engine fuel, and transmission gear ratio. In general, the traction control system of this invention makes primary use of the engine spark controlled for torque management by retarding the ignition timing to reduce engine torque. In one aspect of the invention, when the spark retard reaches a determined limit value, the vehicle automatic transmission is upshifted which reduces axle torque and engine speed, thus reducing the amount of spark retard required to control a slip condition, thereby increasing the authority of the spark retard system. The combustion conditions brought about by retarding the ignition angle will typically result in a rise in the catalyst in a conventional catalytic converter through which the engine exhaust gases pass. Accordingly, the limit spark retard threshold is established as a function of the temperature of the catalytic converter so as to prevent an overtemperature condition. Further, fuel control is ultimately used if control of ignition timing is incapable of bringing the acceleration slip under control. This condition may exist, for example, when the spark system authority of control is insufficient due to limitations placed upon its authority in response to the catalytic converter temperature.

The traction control system of this invention integrates information and controllability already existing within separate vehicle control systems. An engine control module for controlling engine fuel and ignition timing performs engine torque management based upon wheel slip speed such as determined by an existing antilock brake system module. An existing automatic transmission control module further provides control of the gear ratio of the transmission via requests from the engine control module to further reduce axle torque.

The system of this invention differs from prior traction control systems in the specific control employed which makes the engine spark control the primary control variable, with highly integrated use of transmission gear ratio and engine fuel control. These control algorithms make the system predictable and smooth under virtually every operating condition with the engine fuel control left to provide long term controllability if the spark and gear ratio system runs out of control authority.

In the primary control of wheel slip, the engine control module controls the slip to a desired wheel slip by retarding spark to the engine. A catalytic converter temperature model monitors the temperature of catalyst, and based on this temperature and engine speed, limits the authority of the spark retard to prevent the converter from becoming overheated. If the traction control system demands a spark retard within a threshold of the authority limit, the automatic transmission is requested to upshift. The upshift reduces both axle torque and engine speed, thus reducing the amount of spark retard required to control a slip condition and increasing the authority of the spark retard system. The transmission control then remains in an artificially upshifted gear until conditions and tests are met to allow the transmission to return to normal operation. Engine fuel control is employed such as by shutting off the fuel delivered to the engine when the spark retard system reaches its full limit of authority and cannot be called upon to reduce torque further.

DESCRIPTION OF THE DRAWINGS

The invention may be best understood by reference to the following description of a preferred embodiment and the drawings in which.

Figure 1:
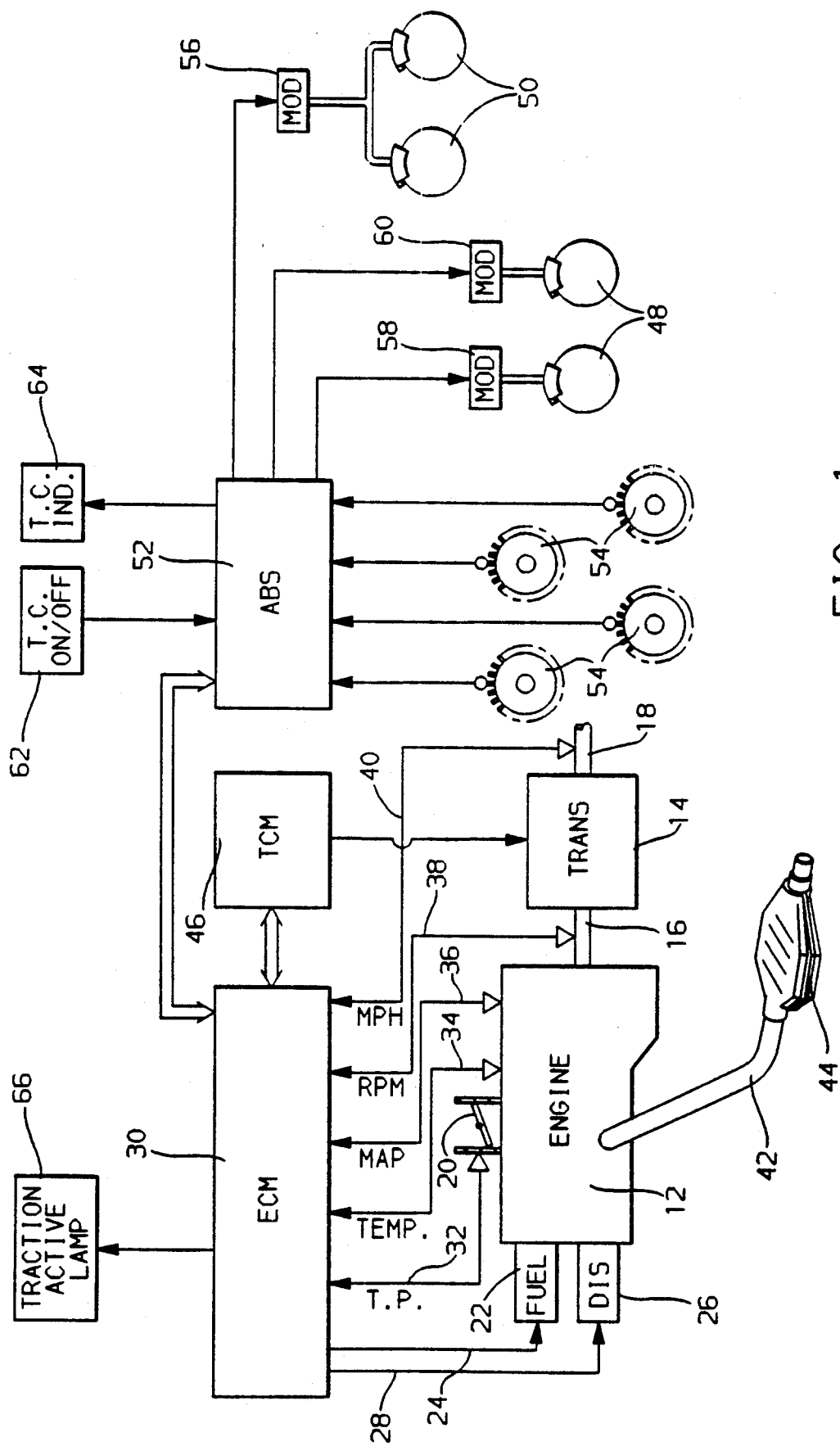
FIG. 1 illustrates a motor vehicle drivetrain and brake system including a spark ignition internal combustion engine, an automatic transmission, a computer based engine control module, a computer based transmission control module, and a computer based antilock brake control system module.

Before proceeding to a description of the traction control system referenced to the drawings, a general overview of the control established by the system set forth in the FIGURES will be set forth.

Engine spark control is the main method of controlling the engine torque output for the purpose of controlling wheel slip. This control uses a proportional plus integral plus derivative (PID) control loop on engine torque loss required to control slip to a predetermined desired slip which is a function of vehicle speed. The magnitude of spark retard for a given torque loss is determined from lookup tables based upon the operating engine parameters. The spark retard is a function of the calculated catalyst temperature in the sense that the maximum spark retard allowed is determined so as to prevent the catalyst from overheating due to traction control torque loss demand.

For purposes of stability, the spark control system has nonlinear control elements in the form of slip triggered high gains, which are enabled if slip is detected after a condition of no-slip is present for a period of time. After a slip event occurs, the slip triggered high gains are used to get the slip under control, after which low gains are used to maintain slip speed stability.

The transmission gear ratio is controlled via the traction control system so as to extend the usability of engine spark control as the prime controlling output, and hence retain smooth operation of the system in the event that spark control alone cannot manage the torque reduction in the present gear ratio. Furthermore, power-on downshifts are inhibited if slip is occurring in the current gear ratio which results in a more predictable vehicle performance.

To accomplish the coordinated control of spark timing and transmission gear ratio, the engine control module sends information to the transmission control module for traction control that includes an indication in the form of an upshift request that the engine spark retard is within a predetermined margin of its control limit as established by a computed temperature of the catalytic converter. It is to this indication that the transmission control module responds to provide a coordinated upshift in the transmission gear ratio.

In general, the transmission control module initializes a minimum available gear for traction control (snowgear) which is initialized to first gear. When the traction control system is activated, snowgear will increase one gear at a time if the following conditions are present: (1) engine spark retard control is retarding spark to within a predetermined margin of its control limit as set forth above and (2) the time since the last upshift is greater than some calibratable time. This timer prevents subsequent upshift events from occurring one on top of another, allowing for the wheel slip to recover in the upshifted gear. If wheel slip is still out of control after the timer has reached its threshold, then snowgear will be incremented again and cause another upshift. If significant engine torque loss is commanded in a gear which is greater than the current snowgear, a downshift is prevented to gears with more axle torque available if significant slip is already occurring in the present gear. Snowgear is allowed to be reduced by three methods. The first method allows for the snowgear to recover and allow power-on downshifts. If no wheel slip is seen with high throttle position in place for a calibratable time period, snowgear is reduced by one gear at a time. The transmission will downshift if the normal transmission shift pattern is calling for a lower gear. If the throttle position continues to be high, snowgear will be decremented again after the calibratable time period expires. In effect, this provides for a slip test, in that a downshift will not be allowed to occur until some time has passed without a slip at a sufficiently high torque input as indicated by throttle position. A second method reduces the snowgear in response to a coastdown situation. If such a condition is sensed, the snowgear is decremented one gear at a time to a gear below the desired gear. The third method provides for reducing the snowgear in response to long periods of time without any wheel slip activity. If such an occurrence should happen, snowgear is reduced one gear at a time until it is reduced to first gear.

Engine fuel cutoff control is integrated into the basic spark and transmission gear ratio control to provide long term controllability under very low coefficient of friction surface conditions. It also provides for preventing slip runaway during the time it takes to upshift the transmission if the system is requesting an upshift while in the lower transmission gear. Engine fuel cutoff control is a special mode of engine torque management which is called for under conditions when the engine spark control cannot control wheel slip while at its maximum authority limit.

Referring now to FIG. 1, there is generally illustrated a motor vehicle drivetrain comprising a spark ignition internal combustion engine 12 and an electronically controlled hydraulic automatic transmission 14. The engine output shaft 16 drives the automatic transmission 14 whose output shaft 18 drives the vehicle wheels for propelling the vehicle. For purposes of illustration, it is assumed that the vehicle is a front wheel drive vehicle such that the transmission output shaft 18 drives the vehicle front wheels.

A throttle 20 positioned by the vehicle operator controls the injection of combustion air through the engine intake manifold. Engine fueling is controlled by a conventional fuel injection apparatus generally designated by the reference numeral 22 in accordance with a fuel pulse width signal on line 24. The engine ignition function is carried out with a conventional direct ignition system generally designated 26 which responds to a spark timing command on signal line 28 to initiate timed combustion in the various engine cylinders. As per conventional practice, the desired timing of spark ignition in the cylinders is established relative to the top dead center position for each of the engine cylinders.

The fuel pulse width signal and the spark timing command signal are generated by a conventional computer based engine control module 30 in a predetermined manner in accordance with the various operating parameters of the vehicle drivetrain. Such parameters are sensed with conventional transducers and provided as inputs to the engine control module 30 via lines 32–40. The sensed parameters include the position (TP) of the throttle 20 (line 32), the engine coolant temperature (TEMP) (line 34), the intake manifold absolute pressure (MAP) (line 36), engine speed (RPM) (line 38), and vehicle speed (MPH) (line 40). The engine control module 30 may be mechanized with a conventional, state of the art microcomputer controller, including a central processing unit, memory and input/output devices.

The air and the fuel mixture provided by the fuel injection apparatus 22 is drawn into the cylinders of the engine 12, is ignited in timed relation to the engine rotation by the direct ignition system 26 and undergoes combustion to develop driving torque delivered to the driven wheels of the vehicle. The combustion gases from the cylinders are then discharged into an exhaust conduit 42 which includes a conventional 3-way catalytic converter 44 and then to the atmosphere. As is well known, the catalytic converter 44 functions to simultaneously convert carbon monoxide, hydrocarbons and nitrogen oxides and thereby reduce emission of those components into the atmosphere.

As indicated above, the spark timing of the engine is typically desired prior to the top dead center position and ignition timing is calibrated in terms of engine crank angle degrees before top dead center. In general, the spark timing of the engine 10 is calibrated as close as possible to the MBT setting for maximizing engine output torque without causing pre-ignition or detonation. The result is a 3-dimensional memory lookup table in which the base calibration timing values are stored as a function of engine speed and manifold absolute pressure. To the extent that the timing calibration is retarded from the MBT setting, there is a corresponding reduction in the engine output torque, as compared to the MBT torque which would occur with ignition timed at the MBT setting established by the spark timing table referred to above. Accordingly, by selectively retarding the spark timing of the signal applied to the engine spark plugs, the engine torque output may be selectively reduced by a desired amount. As will be described, this invention provides for retarding the spark to provide engine torque reduction in response to an excessive acceleration spin condition condition by an amount to establish a controlled slip condition.

The hydraulic automatic transmission 14 establishes the gear ratio between the engine output drive shaft 16 and the transmission output shaft 18. In general, the transmission 14 may take the form of a conventional automatic transmission having four forward speed ratios as well as the conventional reverse gear and neutral and park functions. The transmission 14 is controlled by a conventional transmission control module 46. In general, the transmission control module 46 controls the particular forward gear as a function of a shift pattern stored in a memory. Based upon parameters such as engine load and vehicle speed, the transmission control module 46 controls the transmission to the gear ratio according to the stored shift pattern. Further, the transmission control module 46 limits the upper transmission gear ratio as a function of the conventional manually operated gear ratio selector.

The transmission control module 36 may be mechanized with conventional, state of the art microcomputer controller, including a central processing unit, memory, and input/output devices. The parameters utilized by the transmission control module 46 in controlling the transmission 14 are received via a serial communications link with the engine control module 30.

The vehicle further includes antilock controlled braking of the vehicle front wheel brakes 48 and the vehicle rear brakes 50 so as to prevent an excessive slip condition during vehicle braking. In general, the antilock braking is provided by means of an antilock brake system controller 52 that responds to the vehicle wheel speeds provided by conventional wheel speed sensors 54 to sense an impending wheel lockup condition and for controlling the brakes 48 and 50 to prevent a lockup condition. For example, a wheel lockup condition may be represented by the slip of any one of the individual wheels as represented by the wheel speed relative to the vehicle speed. In general, the rear brakes 50 are controlled by a common hydraulic pressure modulator 56 which may take the form of a motor driven pressure modulator controlled to regulate pressure to the wheel brakes 50 and each of the front wheel brakes 48 are individually controlled by a respective similar modulator 58 and 60 for regulating the brake pressure to the individual front wheel brakes 48.

As with the previous two control modules 30 and 46, the antilock brake control system module 52 may be mechanized with a conventional, state of the art microcomputer controller, including a central processing unit, memory and input/output devices.

As will be described, the engine control module 30, the transmission control module 46 and the antilock brake system controller 52 cooperate to provide the traction control function of this invention. The communication of information between the controllers is provided via serial communication links. For example, front driven wheel slip required to determine an excessive acceleration slip condition is measured by the antilock brake system controller 52 in response to the wheel speed output of the wheel speed sensors 54 and provided to the engine control module 30. Similarly, the control of the transmission is based upon information provided to the transmission control module 46 via the engine control module 30.

The traction control function may be selectively enabled or disabled by the vehicle operator via a traction control on/off switch 62, the output of which is provided to the system via the antilock brake system controller 52. Additionally, the antilock brake system controller controls a traction control on indicator 64 indicating the status of the traction control on/off switch 62 and a traction active lamp 66 is controlled by the engine control module 30 to indicate the system is limiting the torque input to the front driven wheels for traction control.

FIGS. 2-10 depict flow diagrams representative of computer program instructions executed by the computer-based engine control module 30 in carrying out the traction control function of this invention. FIGS. 11-15 depict flow diagrams representative of computer program instructions executed by the computer-based transmission control module 46 of FIG. 1 in carrying out the control of the transmission 14 for traction control in accord with this invention.

Figure 2:
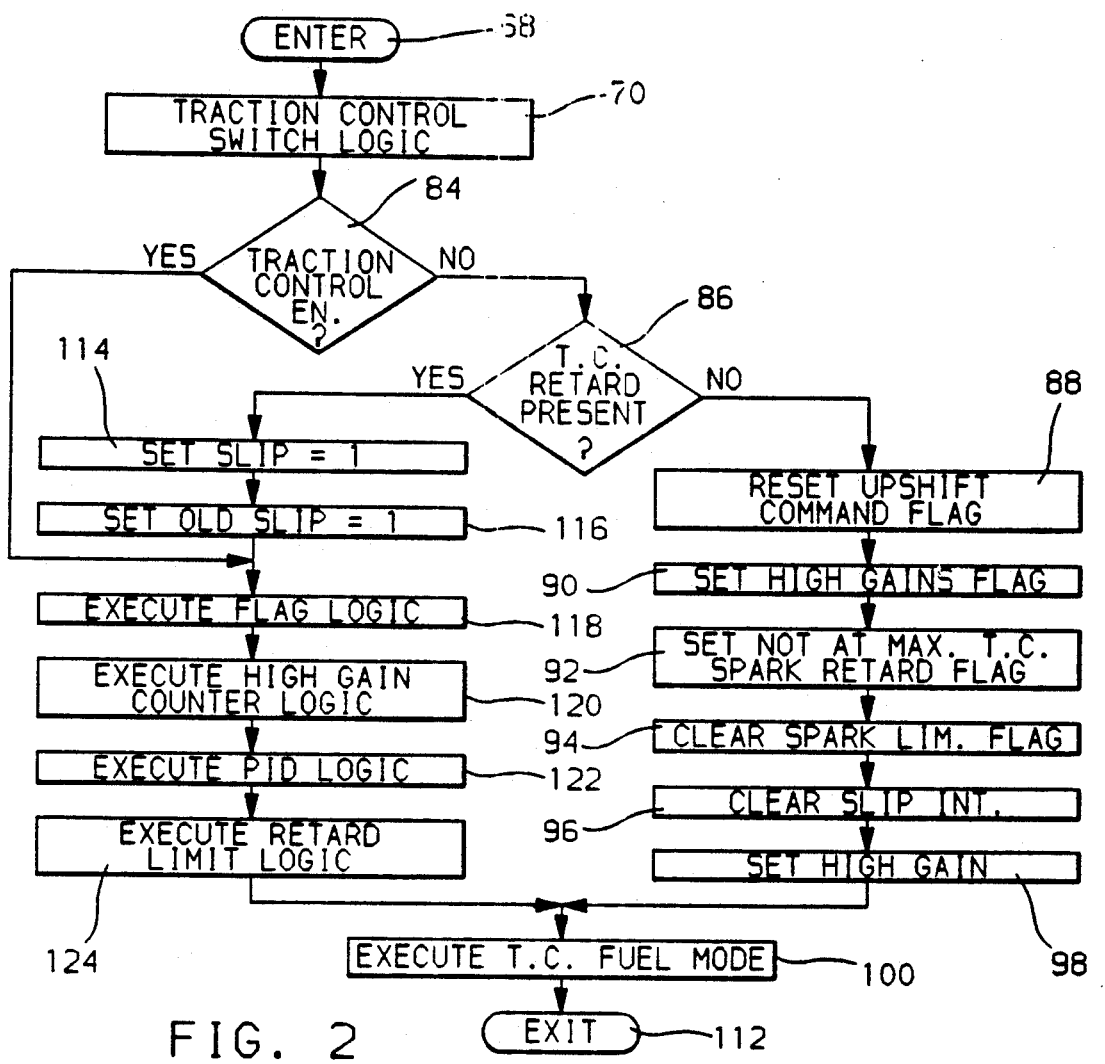
FIGS. 2-15 illustrate the traction control routines executed by the engine control module and the transmission control module of FIG. 1 in carrying out the principles of this invention.
Figure 3:
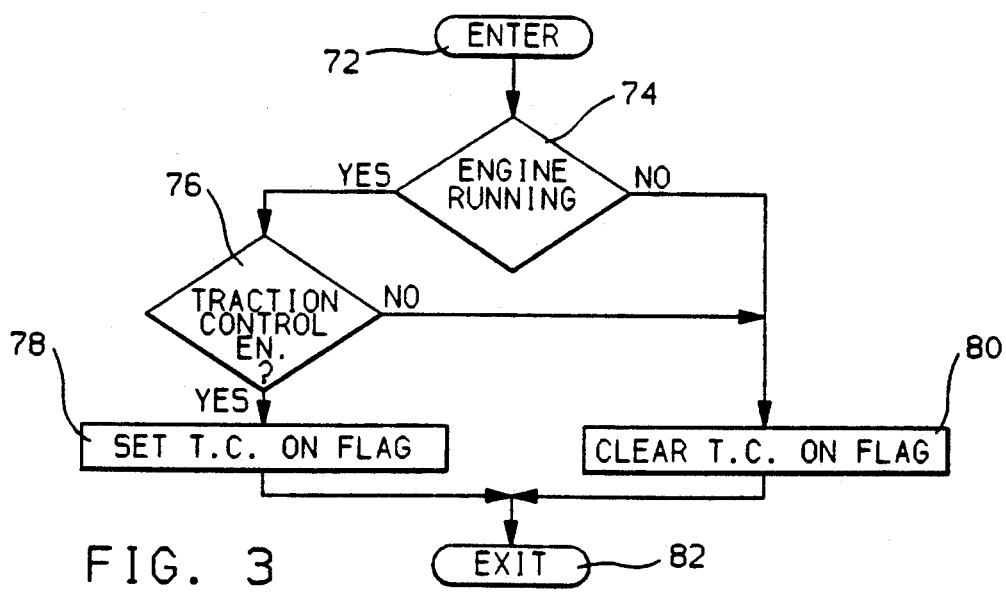

Referring first to FIG. 2, a flow diagram representing an executive or main loop program for traction control is illustrated. This main loop is repeatedly executed at a selected time interval such as 100 milliseconds. The read-only memory in the engine control module 30 contains the instructions necessary to implement the algorithm diagrammed in FIG. 2. The routine of FIG. 2 is entered at point 68 and proceeds to execute a traction control switch logic subroutine 70 to determine whether or not traction control is enabled or disabled based upon engine speed and upon the state of the traction control active switch 62 as selected by the vehicle operator. Referring to FIG. 3, the traction control switch logic subroutine is entered at point 72 and proceeds to a step 74 to determine whether or not the engine is running as represented by the engine speed signal RPM. If the engine is running, a step 76 determines whether or not traction control is enabled or disabled by the vehicle operator represented by the state of the traction control on/off switch 62 of FIG. 1. This information is provided to the engine control module 30 via the serial communication link to the antilock brake system controller 52. If the traction control switch is in an "on" position, a traction control "on" flag is set at step 78 to indicate traction control function is enabled. However, if either the engine is not running (step 74) or the traction control switch 62 is in an "off" position (step 76), the traction control "on" flag is reset at step 80 to indicate that traction control is disabled. The traction control "on" flag further represents a command to the antilock brake system controller 52 to control the traction control indicator 64 to indicate the "on" or "off"

condition of traction control. Following step 78 or 80, the routine returns to the main routine of FIG. 2 via step 82.

Returning to FIG. 2, the routine next samples the traction control "on" flag at step 84 to determine whether or not traction control is enabled. Assuming initially that traction control is not enabled, the program samples a spark retard flag at step 86 to determine whether or not the spark timing is retarded to reduce engine torque in response to a prior action to limit acceleration slip. This flag is controlled via the routine of FIG. 4. If spark timing is not being retarded, various initial conditions are established via steps 88-98. Particularly, step 88 resets a transmission upshift command flag, step 90 sets a high gains flag, step 92 sets a flag indicating that spark retard is not at the maximum traction control spark retard limit, step 94 clears a spark limit flag, step 96 clears a slip integrator flag, and step 98 initializes the high gain value at a predetermined calibration value.

Figure 9:
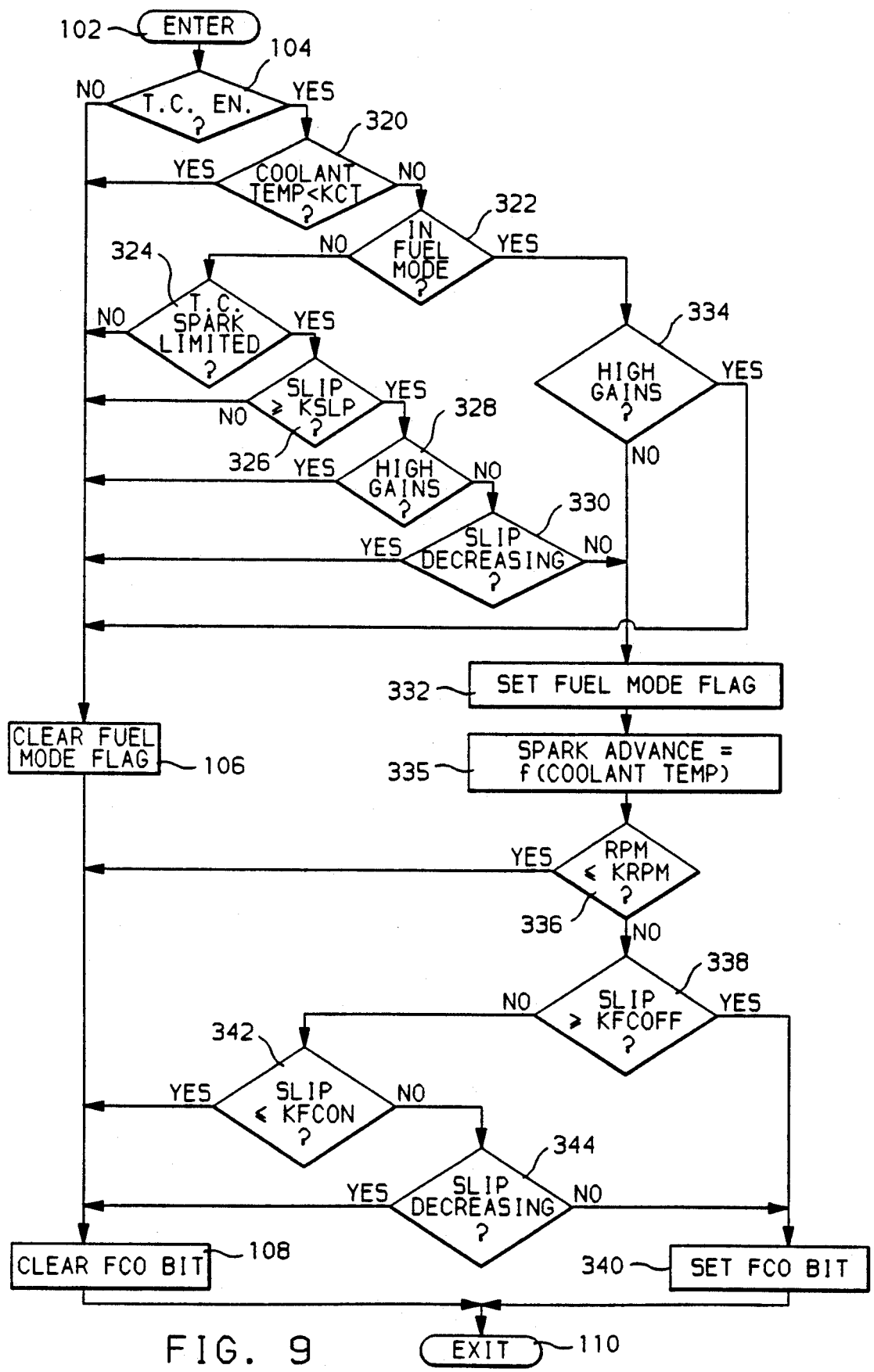

Following step 98, a traction control fuel mode subroutine is executed at step 100 as illustrated in FIG. 9. Referring to this FIGURE and assuming that traction control is not enabled, the fuel control subroutine is entered at step 102 and proceeds to a step 104 where the traction control "on" flag is sampled to determine whether or not traction control is enabled. It will be recalled, that this flag was controlled via the subroutine of FIG. 3. Since traction control is not enabled (the assumed condition), a fuel mode flag is cleared at step 106 after which step 108 clears a traction control fuel control off flag bit to enable fuel to be delivered to the engine via control of the fuel injection apparatus 22 in response to a conventional fuel control routine. Following step 108, the routine returns to the main routine of FIG. 2 via step 110.

Returning to FIG. 2, following execution of the traction control fuel mode, the routine exits the main traction control routine via step 112. The main routine is then again executed after expiration of the predetermined interval such as 100 milliseconds. If the traction control is disabled as sensed by step 84 while the spark timing is being retarded in response to an excessive slip condition as sensed at step 86, the program proceeds to set slip=1 at step 114 and to set old slip=1 at step 116. If traction control is enabled as sensed at step 84 or if traction control retard has not been reduced to zero as sensed at step 86, subroutines 118-124 are executed for controlling spark retard for traction control.

Figure 4:
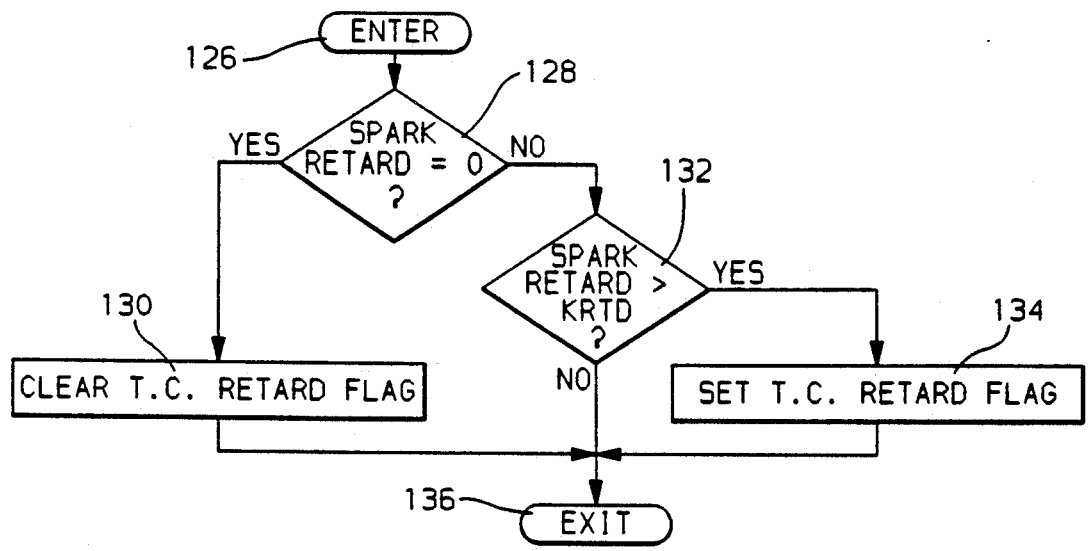

The subroutine 118 executes a flag logic as illustrated in FIG. 4. This routine generally provides an indication of whether or not spark is retarded for traction control. This subroutine is entered at point 126 and proceeds to a step 128 to determine if the spark retard for traction control is at zero. If at zero, a traction control retard flag is cleared at step 130. However, if spark retard for traction control is greater than zero indicating control of engine torque for traction control, a step 132 compares the amount of spark retard for traction control to a calibration retard threshold KRTD. If the spark retard for traction control exceeds the calibration threshold, the traction control retard flag is set at step 134. Following step 130, 134 or step 132 if spark retard is less than or equal to the threshold KRTD, the flag logic subroutine returns to the main routine of FIG. 2 via step 136.

Figure 5:
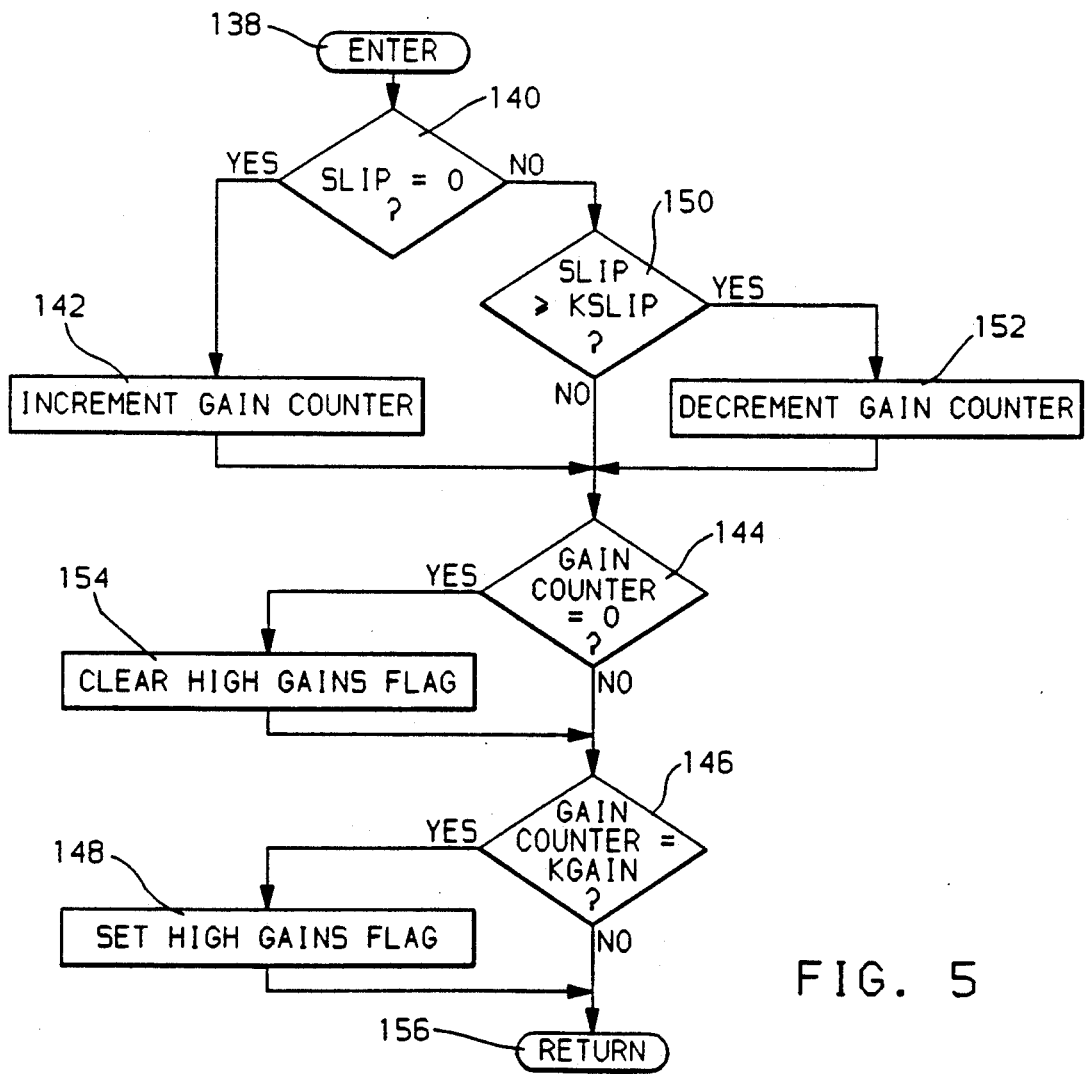

The main control routine then calls for execution of the high gain counter logic subroutine 120 as illustrated in FIG. 5. As will be described, proportional, derivative and integral gains for closed loop control of engine torque in response to a sensed excessive slip condition are set initially to high levels for a predetermined time period following a sensed excessive slip condition so as to provide quick response to the excessive slip condition to quickly arrest wheel slip and prevent an excessive excursion in wheel spin. After the time period expires, the proportional, derivative and integral control gains are set to a low gain value so as to assure stable control of wheel slip for traction control.

The high gain counter logic subroutine of FIG. 5 provides for indicating the conditions for using the high or low gains in the control of spark retard. This subroutine is entered at point 138 and proceeds to step 140 where the value of driven wheel slip as monitored by the antilock brake control system controller 52 of FIG. 1 is compared to zero. Assuming initially that the slip is equal to zero, a gain counter is incremented at step 142. This gain counter provides for two functions. First, the gain counter provides for establishing a period following initiation of traction control during which high gains are used to quickly arrest wheel spin and further provides for establishing a time period after the slip has been reduced to zero following which high gains are reset in preparation for the next entry into traction control in response to an excessive spin condition. Following step 142, the gain counter is compared to zero at step 144. Assuming greater than zero, the gain counter is compared at step 146 to a calibration value KGAIN representing a predetermined time period. If the gain counter is equal to KGAIN, the high gains flag is set at step 148 to indicate use of high gains in the control of spark retard in response to a sensed excessive slip condition. This is the normal condition of the high gains flag prior to entry into traction control. Returning to step 140, if the wheel slip is greater than zero, the wheel slip is compared to a calibration value KSLIP at step 150. If not greater than this threshold, the steps 144, 146 and 148 are repeated as set forth above assuming the gain counter is greater than zero. However, if step 150 determines that the wheel slip is greater than or equal to the threshold value, the gain counter is decremented at step 152 and then compared to zero at step 144. If not equal to zero, the high gains flag remains set. As long as the slip is greater than or equal to the threshold KSLIP determined at step 150, the gain counter continues to be decremented until such time that it becomes zero as sensed at step 144. When this condition is sensed, the high gains flag is cleared at step 154 to command the control of spark retard using low gain values. As can be seen from the foregoing, the gain counter provides for establishing a time delay from the period that slip becomes greater than the value KSLIP during which the high gain values are commanded so as to quickly arrest the excessive slip condition. Thereafter, the gain is commanded to a low level to provide for stable control for maintaining wheel slip stability.

It can also be seen that the gain counter provides for timing the period after the slip has been reduced to zero via step 142 such that the high gains flag is again set at step 148 after a time period determined by the calibration value KGAIN at step 146. This provides initializing the gains for the next control of wheel slip in response to an excessive slip condition. From 146 or 148, depending on the value of the gain counter, the routine of FIG. 5 returns to the main routine of FIG. 2 via the step 156.

Figure 6A:
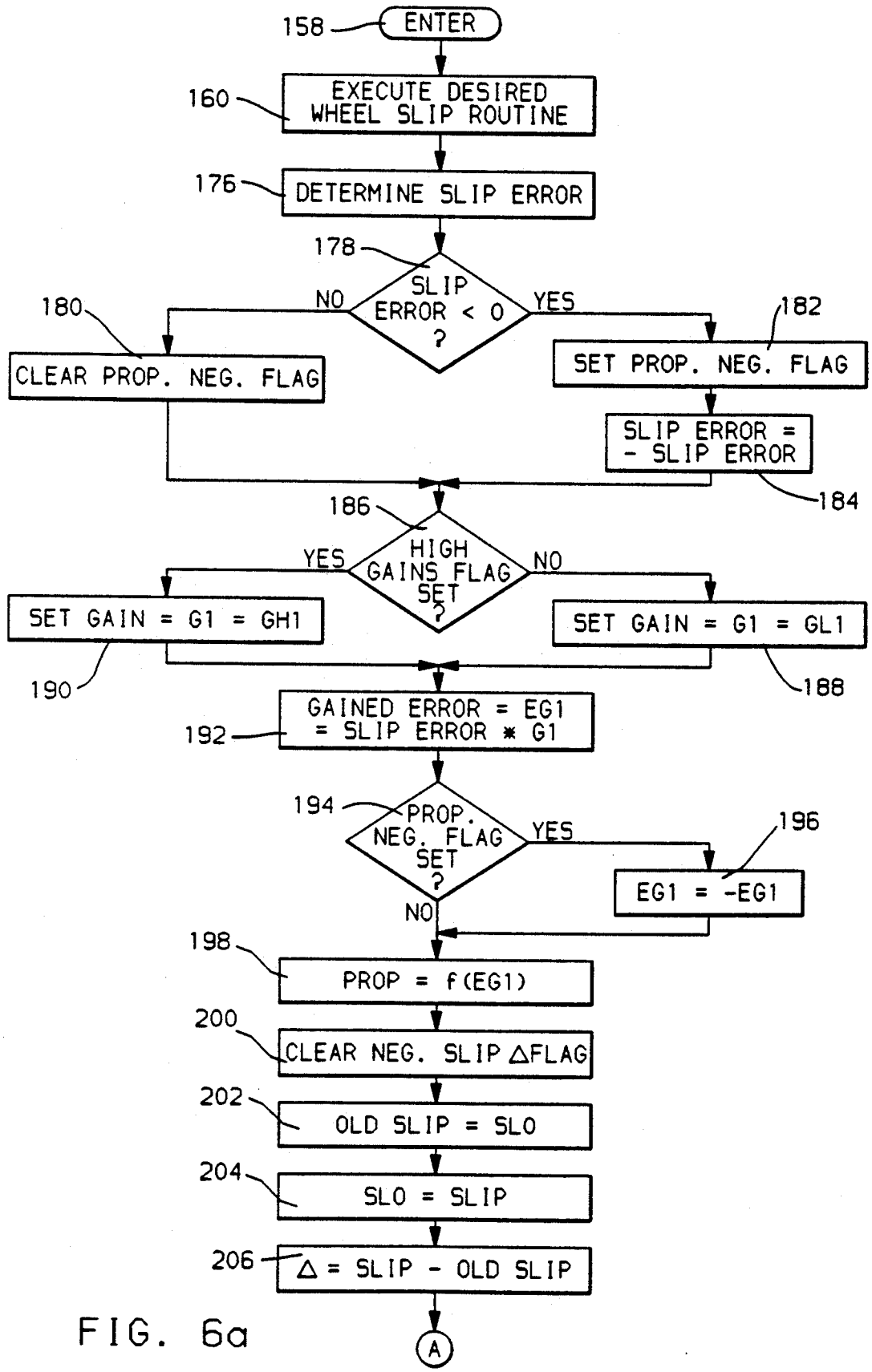
Figure 6B:
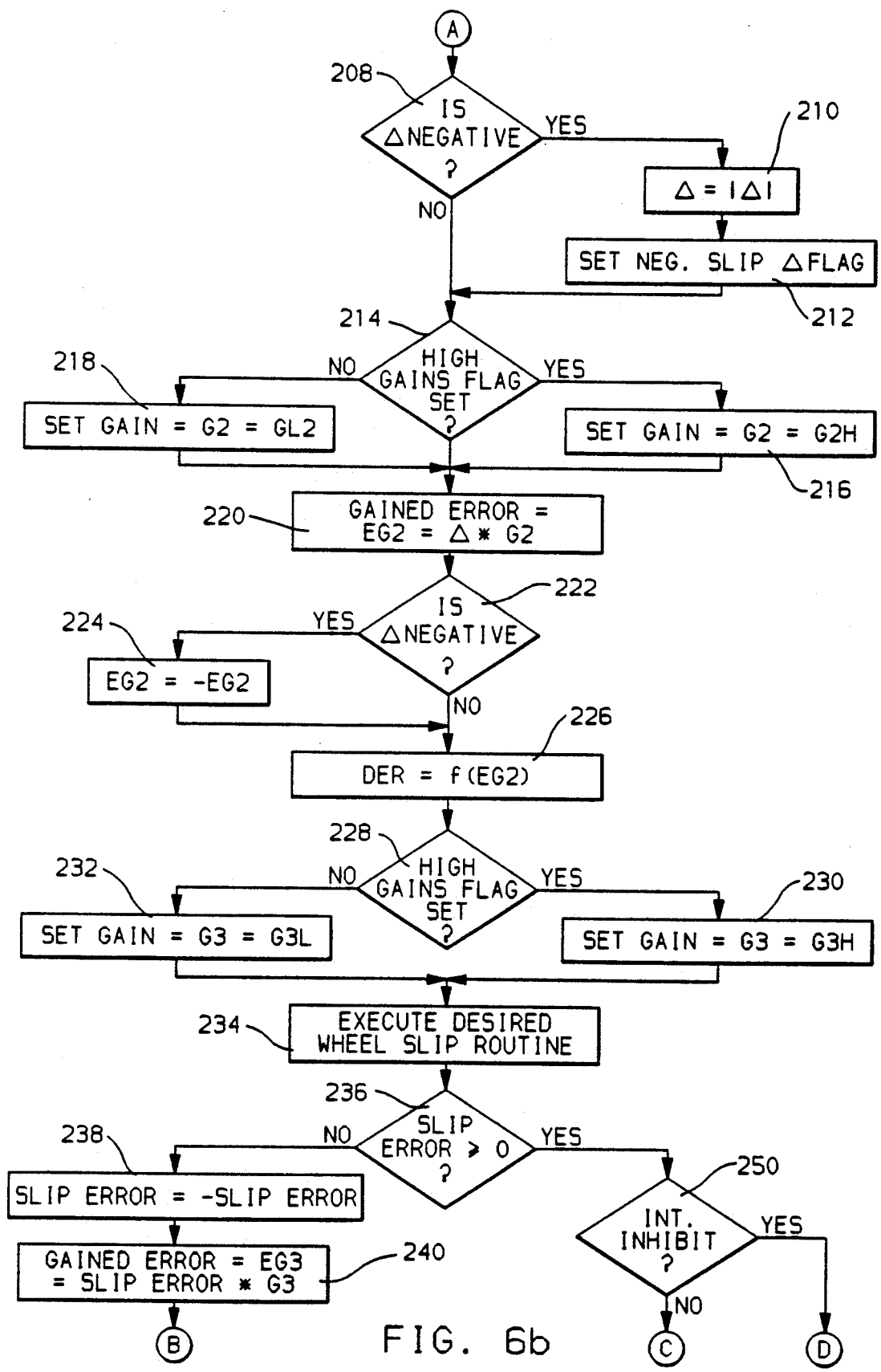
Figure 6C:
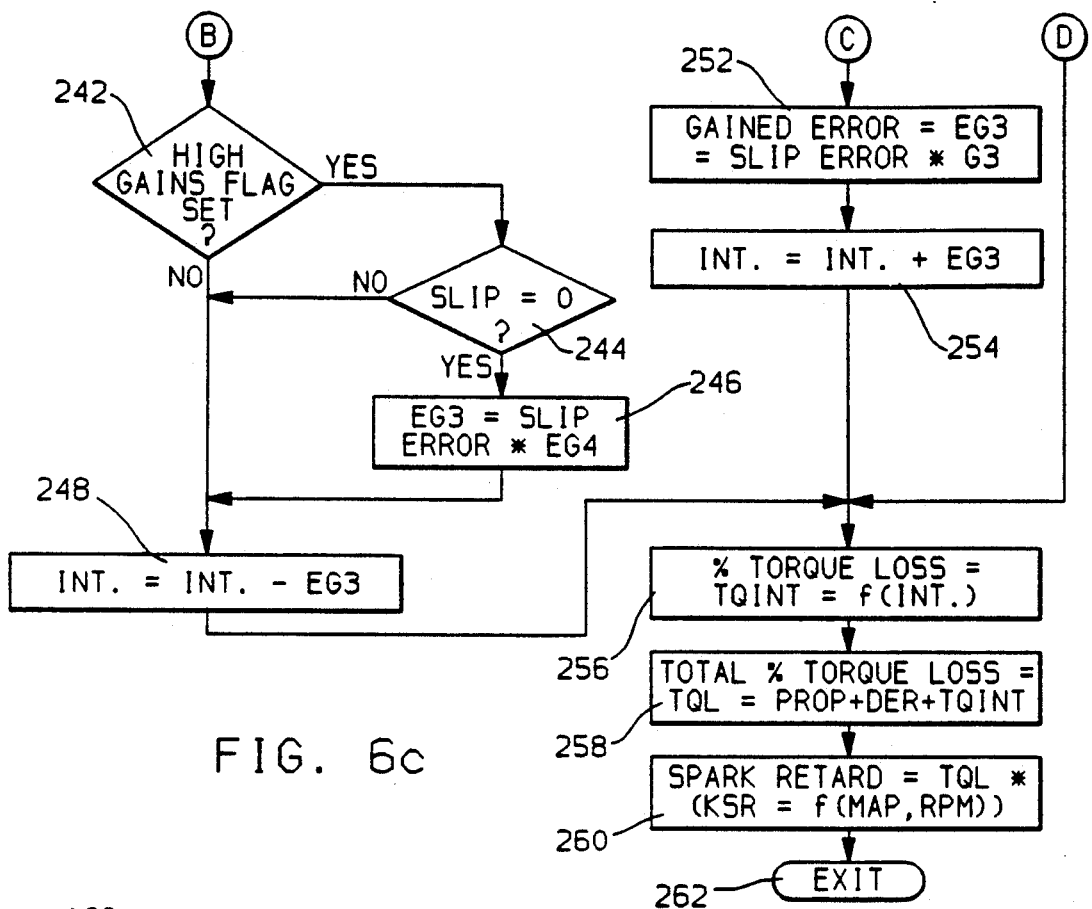

The main control routine of FIG. 2 next executes the proportional-integral-derivative logic subroutine as illustrated in FIG. 6. In general, the routine 122 as illustrated in FIG. 6 provides for proportional and integral adjustments of the spark retard as a function of the error in wheel slip and a derivative adjustment as a function of the rate of change in wheel slip. This routine is entered at step 158 and then executes a series of steps 160-198 to determine a proportional term adjustment to engine torque. First, at step 160, a desired wheel slip value is determined as a predetermined function of vehicle speed.

Figure 7:
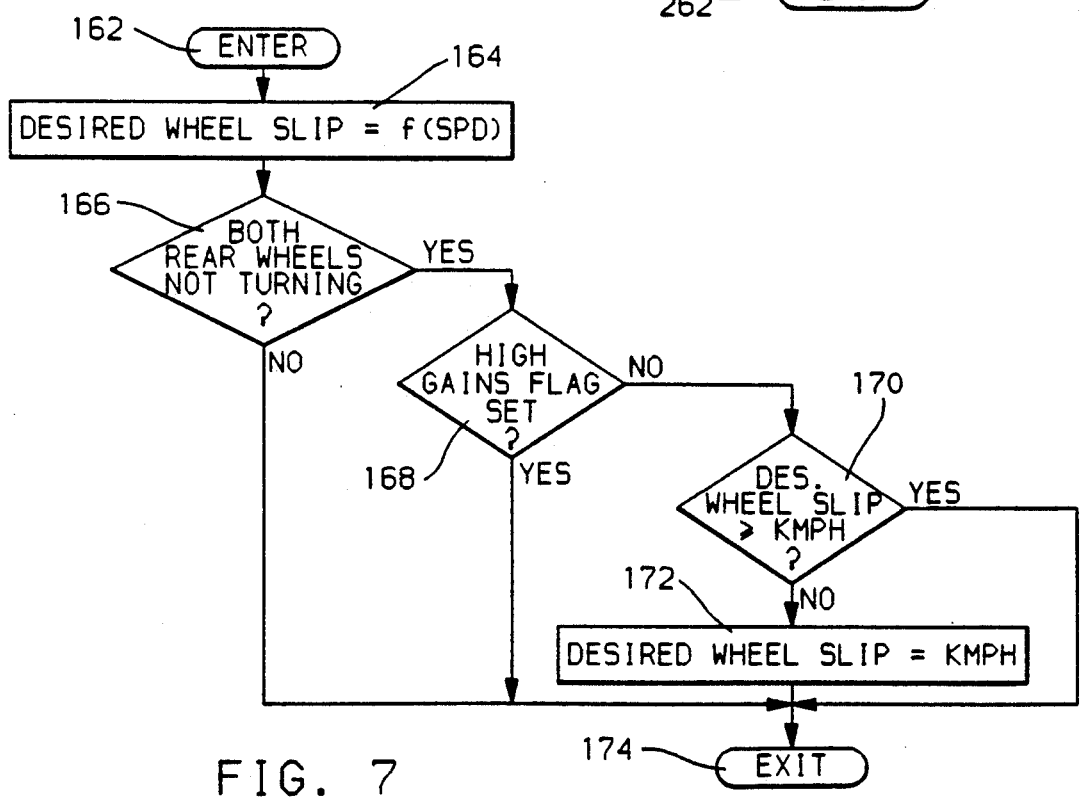

FIG. 7 illustrates the subroutine 160 for determining the desired wheel slip from which the slip error is determined. This routine is entered at step 162 and proceeds to a step 164 where the desired wheel slip is determined from a lookup table of values addressed as a function of vehicle speed. This desired wheel slip calibration table provides a schedule of values representing optimum slip values for vehicle acceleration.

The desired wheel slip established by step 164 is utilized in the PID logic subroutine 122 to determine a slip error if the vehicle is not in a stuck condition and the desired wheel slip is greater than or equal to a calibration value KMPH that is a function of vehicle speed. A vehicle stuck condition is sensed by steps 166 and 168 by detecting if both of the undriven rear wheels are not turning (step 166) for a period represented by the time required to reset the high gain flag (step 168). If the steps 166 and 168 determine a stuck condition and step 170 determines that the desired wheel slip is not greater than or equal to the calibration threshold value KMPH, the desired wheel slip is set to a new value that is typically higher than the value established by step 164 so as to assist in alleviating the unstuck condition of the vehicle. If the vehicle is not in a stuck condition (steps 166 and 168) or the desired wheel slip value is greater than or equal to the threshold KMPH, the step 172 is bypassed and the desired wheel slip utilized to determine a wheel slip error remains at the desired wheel slip established via step 164. The routine then returns to the main loop of FIG. 2 via step 174.

The slip error is then determined at step 176 based upon the difference between the desired speed established via step 160 and the actual slip computed by the antilock brake system controller 52.

The next steps 178-184 determine the absolute value of the slip error determined at step 176 and if negative sets a proportional negative flag to indicate that the slip error value is a negative slip. Accordingly, if the slip error is zero or greater, the proportional negative flag is cleared at step 180. Conversely, if the slip error is negative, the proportional negative flag is set at step 182 and the absolute value of slip error is established at step 184.

The next step 186 determines whether or not the proportional correction should be based upon high or low gains as established by the high gain counter logic routine of FIG. 5. If the high gains flag is cleared to establish a low proportional gain, a step 188 sets the proportional gain $G_1$ equal to a calibration value GL1. Conversely, if the high gains flag is set, a step 190 is executed to set the proportional gain G1 equal to a calibration high gain value GH1. At the next step 192, a gained proportional error EG1 is computed by multiplying the slip error times the gain established via either step 188 or 190. Subsequently, steps 194 and 196 establish the proper sign of the gained error computed at step 192.

The routine next determines at step 198 the proportional adjustment to the engine torque output in terms of percent engine torque reduction. This is accomplished by establishing the required proportional percent torque loss correction to engine torque as a function of the gained error EG1. This value may be obtained from a lookup table of values storing proportional adjustments to the engine torque in terms of percent engine torque reduction as a predetermined function of the gained error EG1. Further, separate tables may be provided to establish the proportional percent torque adjustment depending upon whether the gained error is positive or negative.

Following the determination of proportional term correction to the engine torque output, the routine next determines via steps 200-226 the derivative term correction to the engine torque output. This begins at step 200 where a negative slip change flag is precleared after which the value of slip during the prior execution of the main routine is stored as an old value at step 202 and the old slip value SLO to be used during the next execution of the mean routine is set equal to the current slip value at step 204. The change in slip occurring over the interval between executions of the main loop is computed at step 206 by subtracting the old slip value stored at step 202 from the current slip value. Steps 208-212 then provide for determining the absolute value of the change in slip. If the change is negative (step 108) the change is set equal to the absolute value (step 210) and a negative slip change flag is set (step 212) to indicate that the change in slip is a negative value.

The routine next determines the derivative gain based upon the high gains flag condition established via the high gain counter logic subroutine 120 of FIG. 5. If the high gains flag is set as determined at step 214, the derivative gain G2 is set to a high gain value G2H at step 216. If, however, the high gains flag is not set, a step 218 establishes the derivative gain G2 at the low gain value GL2. Thereafter at step 220, the derivative gained error EG2 is set equal to the change in slip determined at step 206 times the gain G2 established by step 216 or 218. Steps 222 and 224 restore the proper negative signed value to the gained error if step 222 senses the negative slip change flag was set at step 212.

Thereafter, the derivative correction to the engine torque output in terms of percent adjustment in engine torque is obtained from a lookup table as a predetermined function of the gained error EG2 at step 226. As with the proportional correction term, the derivative term correction of the engine torque output may be obtained from two separate lookup tables depending upon whether the gained error EG2 is positive or negative.

The routine next determines the integral term correction to the engine torque output in terms of percent engine torque reduction via steps 228-256. The routine first determines the integral term gain. If the high gains flag is set as determined at step 228, the integral gain G3 is set equal to a high gain calibration value G3H at step 230. Conversely, if step 228 indicates the high gains flag is reset, a step 232 sets the integral gain G3 equal to a low calibration gain value G3L. The routine then again executes the desired wheel slip subroutine of FIG. 7 at step 234. The next step 236 determines whether or not the slip error represented by the actual slip determined at step 234 minus the desired wheel slip is positive or negative. If negative indicating the actual slip is less than desired, the absolute value of slip error is determined at step 238 after which a gained error value EG3 is determined as the product of the slip error and the integral gain G3 established via step 230 or 232.

If high gains are being used for control and the wheel slip is equal to zero, the routine then further increases the integral gain to provide for faster recovery of engine torque. This is provided beginning at step 242 where the high gains flag is sampled. If set, and step 244 further determines that slip is equal to zero, the integral gain EG3 is further increased by a calibration factor EG4 at step 246. Thereafter, or if the high gains flag was reset (step 242) or slip was determined not to be equal to zero (step 244), the integral correction term is decreased by the gain factor EG3 at step 248.

Returning to step 236, if the slip error is determined to be equal to or greater than zero indicating slip is greater than desired, an integrator increase inhibit flag is sampled at a step 250. This flag will be set if there is any reason to inhibit further increase in the integrator output. Assuming the inhibit flag is not set, the integral gain error EG3 is set equal to the slip error times the integral gain G3 at step 252. Thereafter, the integral term is incremented by the gained error value EG3 at step 254. The steps 252 and 254 are bypassed so as to prevent further increase in the integral term if the inhibit flag was determined to be set at step 250.

The percent of engine torque loss TQINT as a function of the integral term is then determined at step 256. This value may be obtained from a lookup table of percent torque loss values as a predetermined function of the magnitude of the integral term.

The total percent engine torque loss TQL represented by the proportional, derivative and integral terms is then determined at step 258 by summing the proportional, derivative and integral percent torque loss terms determined as set forth above. The amount of spark retard then required in order to achieve this percent reduction of engine torque is computed at step 260 by multiplying the percent of torque loss required established by step 258 times a factor that is a function of engine manifold absolute pressure and engine speed. This factor is obtained from a lookup table of calibration values determined to convert the percent of torque loss required into a spark retard amount. Following this step, the PID logic subroutine 122 returns to the main routine of FIG. 2 via step 262.

The main control routine next executes the retard limit logic subroutine 124. In general, this routine provides for placing a limit on the allowed spark retard based upon a determined temperature of the catalytic converter in order to prevent an overtemperature condition of the converter. When the spark retard otherwise determined approaches this limit value, the subroutine of step 124 commands a transmission gear upshift When this command is followed through by the transmission control module 46, the upshift will result in both the axle torque and engine speed being reduced, thereby reducing the amount of spark retard required to control the slip condition. This effectively increases the authority of the spark retard system for maintaining control over the acceleration slip. Further, as will be described in regard to the traction control fuel mode subroutine of step 100, the fuel delivered to the engine will be commanded to be shut off if the spark retard with the expanded authority provided by transmission upshift is still unable to control slip within the authority limit established by the catalytic converter temperature.

Figure 8A:
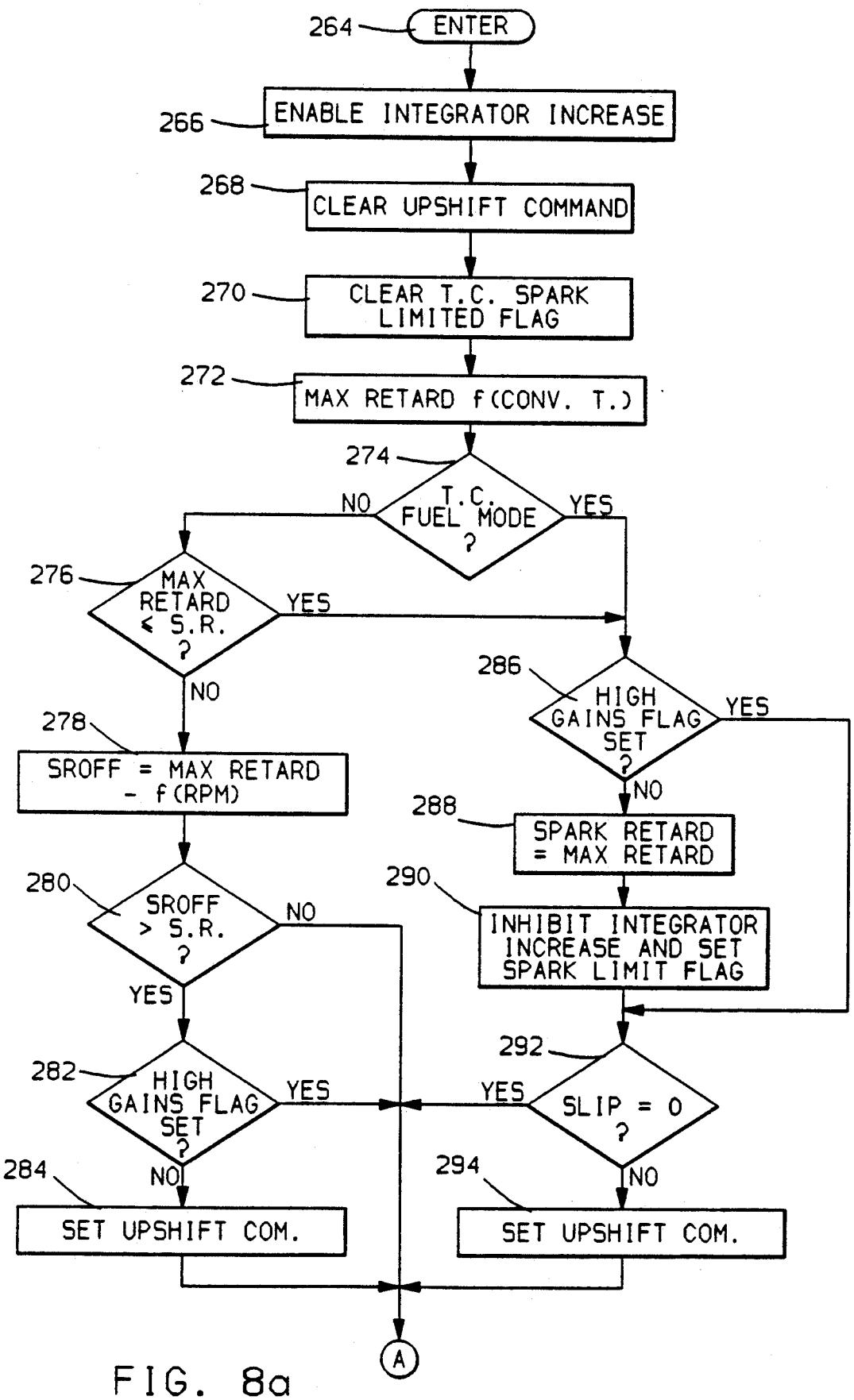
Figure 8B:
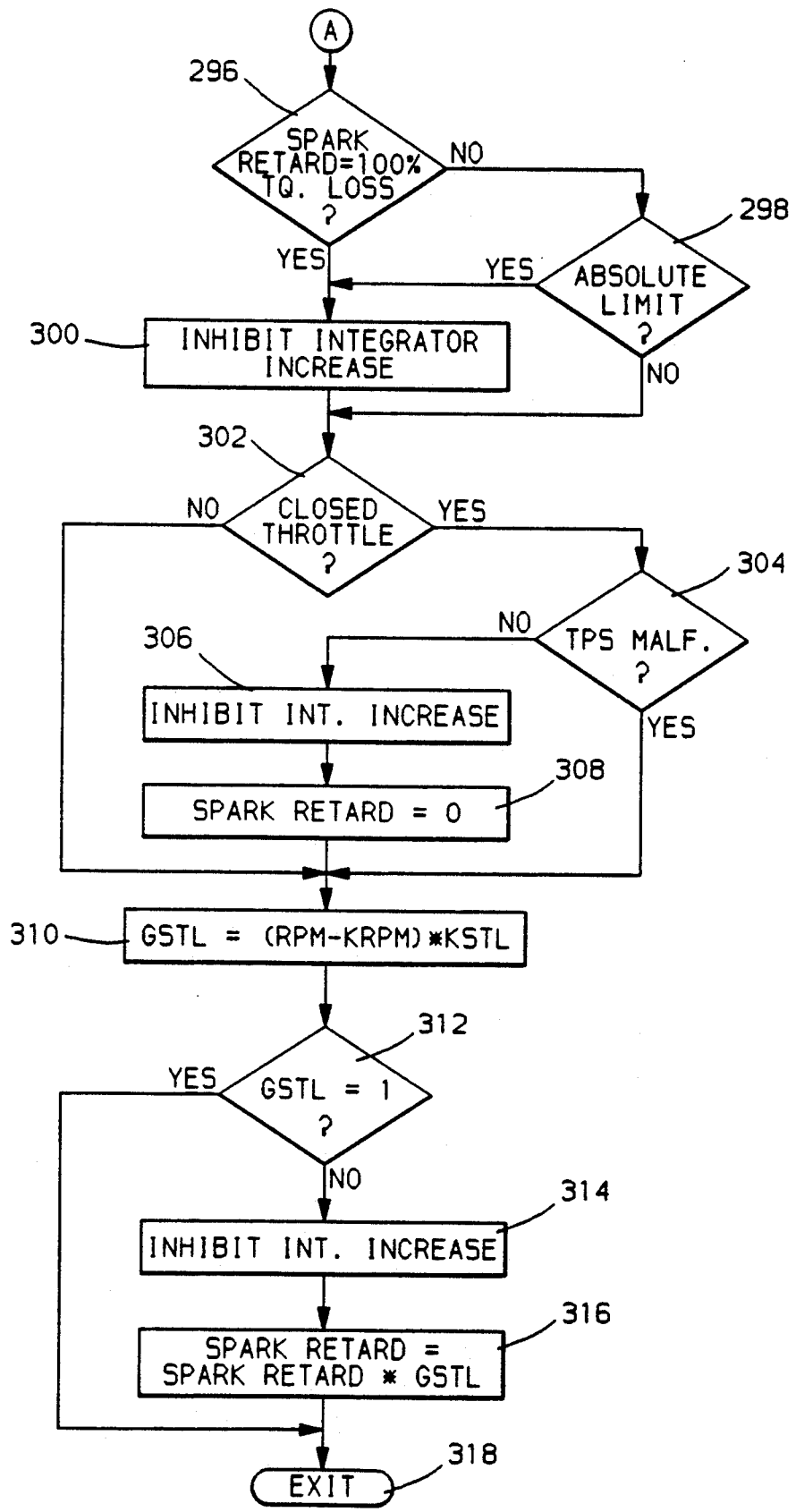

Referring to FIG. 8, the retard limit logic subroutine is entered at point 264 and then proceeds to pre-clear the following flags: the integrator increase enable flag utilized at step 250 of the PID logic subroutine 122 is cleared (step 266); the upshift command flag is cleared (step 268), and the traction control spark limited flag is cleared (step 270).

At the next step 272, a maximum allowable spark retard as a predetermined function of the catalytic converter 44 catalyst temperature determined to prevent an overtemperature condition of the converter is obtained from a memory lookup table as a predetermined function of catalytic converter temperature. The stored values are predetermined limits determined to assure satisfactory and safe operation of the catalytic converter 44. In this embodiment, the temperature of the catalyst is estimated based upon a predetermined model of the catalytic converter temperature as a function of predetermined engine operating conditions. This estimation of the catalytic converter temperature will later be described in reference to FIG. 10.

Assuming first that the traction control fuel mode has not been enabled as determined by a step 274, the program determines at step 276 if the spark retard value established by the PID logic subroutine 122 is greater than the allowable limit established at step 272. If not, the program determines at step 278 a threshold level indicating the spark retard approaching the maximum retard limit. This threshold SROFF is established at a level less than the maximum retard value by an offset amount that is a predetermined function of engine speed. The spark retard value is then compared to this threshold at step 280. If the spark retard is greater than the threshold SROFF as determined at step 280 indicating that the spark retard is approaching the maximum allowable spark retard value, an upshift is commanded only if the high gains flag is not set. If set, the spark retard is allowed to increase without commanding a shift. Accordingly, if the spark retard is greater than the threshold SROFF indicating that the spark retard is approaching the maximum allowable value and a step 282 determines the high gains flag is reset, a step 284 requests an upshift by setting an upshift command flag.

Returning to step 274, if the traction control fuel mode is enabled to inhibit fuel as a result of the spark retard authority not being sufficient to limit wheel spin, or if step 276 determines that the spark retard is greater than the maximum allowable retard value, the high gains flag is first sampled at a step 286 to determine if the spark retard can be allowed to increase unconstrained. If not set indicating that the engine torque output has been limited for a period of time greater than the time required to reduce the control gains, the spark retard is set equal to the maximum allowable retard at step 288 after which the integrator increase is inhibited at step 290 since the spark retard has already been established at the maximum value at the prior step. Further at this step, the spark retard limit flag is set.

Returning to step 286, if the high gains flag is set, the steps 288 and 290 are bypassed allowing the spark retard to be increased unconstrained. Thereafter via steps 292 and 294, as long as spark retard is being limited and the wheels are slipping, step 294 requests a transmission gear upshift by setting the upshift command flag. Otherwise, step 294 is bypassed.

The next steps 296–300 provide for inhibiting at step 300 further increases in the integral term of the spark retard established by the PID logic subroutine 122 if the spark retard is already at a level corresponding to 100% torque loss in the engine (step 296) or if the spark retard is at an absolute spark retard limit (step 298). Otherwise the integral term of the spark retard is allowed to increase.

Further, if a step 302 determines the throttle 20 is closed and step 304 determines there is no throttle position sensor malfunction, a step 306 inhibits further increases in the integral term of the spark retard after which the spark retard is reset to zero at step 308. If either the throttle is closed or a throttle position sensor malfunction is indicated, the steps 306 and 308 are bypassed via step 302 or step 304.

The next steps 310-316 provide for stall prevention by limiting the spark retard when the engine speed is low. This is accomplished by establishing a spark retard gain value decreasing from unity at a predetermined engine speed to a value of zero at a calibration engine speed value KRPM such as 400 RPM. This gain value determined at step 310 is compared to unity at step 312. If not equal to unity, further increases of the integrator are inhibited at step 314 after which spark retard determined via the PID logic subroutine 122 is reduced at step 316 by the gain factor GSTL. Accordingly, as the engine speed approaches the lower limit KRPM, the traction control spark retard is reduced toward zero. Following the stall prevention steps, the program returns to the main routine of FIG. 2 via step 318.

Lastly, the main routine executes the traction control fuel mode 100 as illustrated in FIG. 9. As previously indicated, as long as the traction control is not enabled as sensed at step 104, the traction control fuel mode flag is cleared at step 106 and the fuel control on flag bit is cleared to enable fuel to be delivered to the engine in the normal manner. However, if traction control is enabled, fueling of the engine is similarly maintained if the coolant temperature is less than a calibration value KCT as determined at step 320. However, assuming the coolant temperature exceeds the threshold KCT, the routine then determines at step 322 if the fuel shutoff mode is already active. If not, the routine determines at steps 324-330 if the entry conditions for entering into the fuel shutoff mode exist. These conditions include: the spark limit flag being set at step 290 of FIG. 8 indicating spark retard is being limited (step 324), the wheel slip exceeding the threshold KSLP (step 326), the high gains flag being reset indicating traction control has been active for a time greater than the time for reduced gains to be low gains (step 358), and slip is still increasing (step 330). If any one of the conditions for entering the fuel mode is not present, the fuel mode flag is cleared at step 106 and the fuel control "off" flag bit is cleared at step 108 to enable fuel control. Otherwise if all of the conditions exist, the fuel mode "off" flag bit is set at step 332.

Returning to step 322, if the system is already in the fuel mode, the fuel mode is cleared if step 334 indicates that the high gains flag is set. It will be recalled that this flag will have been set by the high gain counter logic subroutine 120 of FIG. 2 if the wheel slip is zero for a predetermined period of time. If, however, the high gains flag is not set, the fuel control mode flag is set at step 332.

In order to avoid a backfire condition, the next step 334 limits the spark advance as a predetermined function of the engine coolant temperature. Next, at step 336, the engine speed is compared with a threshold KRPM to determine if the engine speed is less than a minimum level for disabling fuel for traction control. If the engine speed is less than the threshold, the fuel control "off" flag bit is cleared at step 108. Otherwise, the enabling or disabling of fuel for traction control is based on the magnitude of slip and whether or not slip is decreasing. Specifically, if step 338 determines that the wheel slip is greater than a threshold KFCOFF, the fuel control "off" flag bit is set at step 340 to disable fuel delivery to the engine 12. If the slip is less than the threshold KFCOFF, the step 342 determines if the slip is less than a threshold KFCON that is lower than the threshold KFCOFF. If the slip is less than this threshold, the fuel control "off" flag bit is cleared at step 108 to enable fuel delivery. However, if the slip is between the two thresholds, a step 344 determines if slip is increasing or decreasing. If decreasing, the fuel is enabled by clearing the fuel control "off" flag bit at step 108 and if the slip is increasing, the fuel delivery is disabled by setting the fuel control "off" flag bit at step 340. Following control of the fuel control mode, the traction control fuel mode returns to the main routine via step 110. Fuel delivery is then disabled if the fuel control "off" flag bit is set and normal fuel delivery is enabled if the "off" flag bit is reset.

Figure 10:
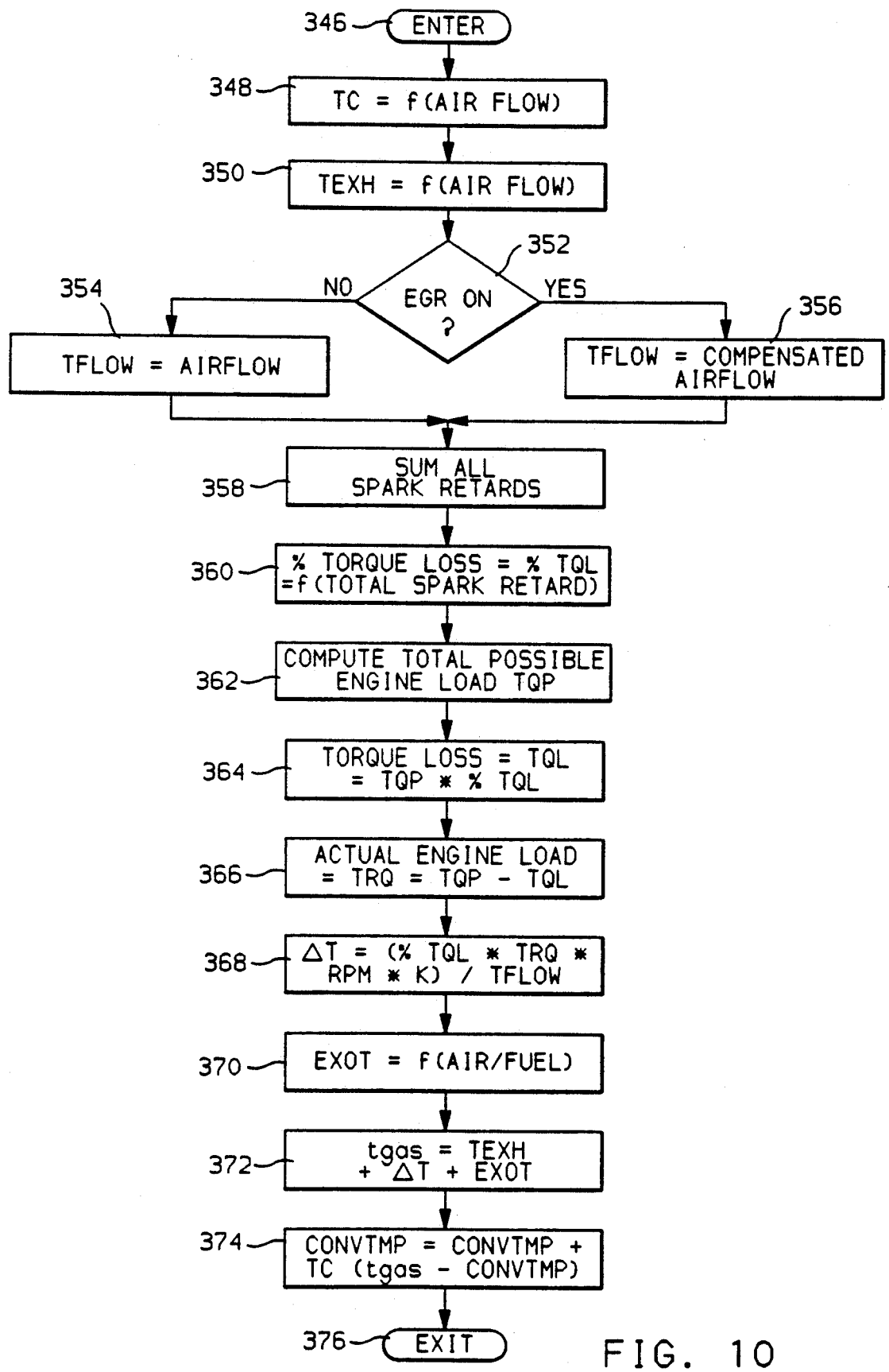

Referring to FIG. 10, the routine for estimating the temperature of the catalyst in the catalytic converter 44 is illustrated. As indicated, this temperature is utilized in the retard limit logic subroutine 124 to prevent a spark retard amount that would result in an overtemperature condition of the catalytic converter 44. This routine is repeatedly executed at a predetermined interval of, for example, 200milliseconds. In general, the routine of FIG. 10 estimates the catalyst temperature based upon a catalyst model using an exhaust temperature term TEXH, an exotherm term EXOT and a delta T term that is a function of the spark retard. The routine is entered at point 346 and proceeds to a step 348 where a time constant value TC is determined as a predetermined function of the engine airflow. Thereafter, the exhaust temperature term TEXH is obtained at step 350 from a lookup table as a predetermined function of the engine airflow. Next, the routine determines the total gas flow dependent upon whether or not exhaust gas recirculation is on as sensed at step 352. If the exhaust gas recirculation is on, the total gas flow is set equal to the computed airflow at step 354. Otherwise, the total gas flow is a compensated airflow determined at step 356.

The routine next determines the delta T temperature term that is a function of the spark retard of the engine. This begins at step 358 where all of the spark retards of the engine are summed, including retard of spark for avoiding knock, and traction retard as set forth above. Thereafter, at step 360, a percent torque loss %TQL in the engine due to spark retard is determined as a predetermined function of the total spark retard computed at step 358. The total possible engine load TQP is then computed at step 362. This value is computed as a predetermined function of manifold pressure, the volumetric efficiency of the engine, fuel flow and predetermined constants. The actual torque loss TQL then is computed at step 364 by multiplying the total possible engine load torque by the percent of torque loss %TQL due to spark retard computed as step 360. The actual engine load is then computed at step 366 by subtracting the torque loss TQL due to spark retard from the total engine load TQP. From this value then, the delta T component of the converter temperature is computed at step 368 in accord with the expression (%TQL×TRQ×RPM×K)/airflow, where K is a predetermined constant. Next, the exotherm component EXOT of the temperature of the catalyst is determined at step 370 as a predetermined function of the air/fuel ratio of the mixture delivered to the cylinders of the engine 12. The final gas temperature is determined at step 372 by summing the three components TEXH (step 350), Delta T (step 368) and EXOT (step 370). Finally, at step 374, the converter temperature is determined in accord with a first order lag filter equation having the time constant established at step 348 and based upon the gas temperature established at step 372. Based upon this temperature, the maximum spark retard is established at step 272 of FIG. 8 to prevent an overtemperature condition of the catalytic converter. The routine then exits at step 376.

Figure 11:
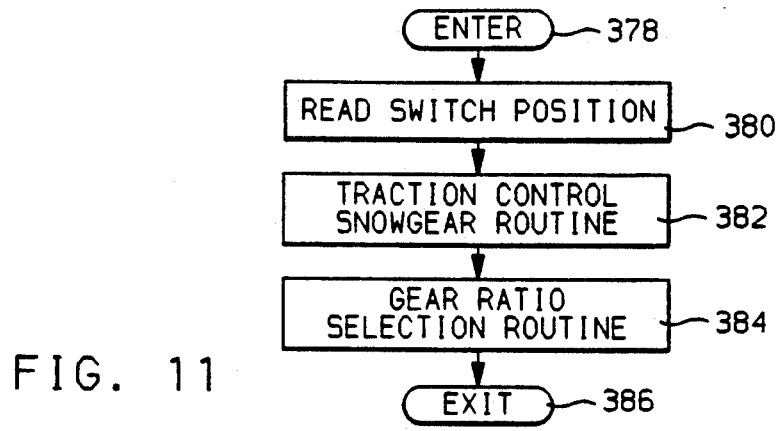

FIGS. 11-15 illustrate the operation of the transmission control module 46 in establishing the minimum gear ratio (snowgear) to enable the spark retard to have the authority to limit traction control without exceeding the spark retard limit required for protection of the catalytic converter 44. FIG. 11 illustrates the main routine executed for scheduling the gear ratio for traction control. This routine is repeatedly executed at a predetermined time interval such as 10 milliseconds.

The main routine is entered at step 378 and proceeds to a step 380 to read the gear selector switch position established by the vehicle operator. The routine then executes a traction control subroutine at step 382 to establish the snowgear which is the minimum available gear for traction control and is generally initially at first gear prior to initiation of traction control. A gear ratio selection subroutine is executed at step 384 after which the routine exits at step 386.

Figure 12A:
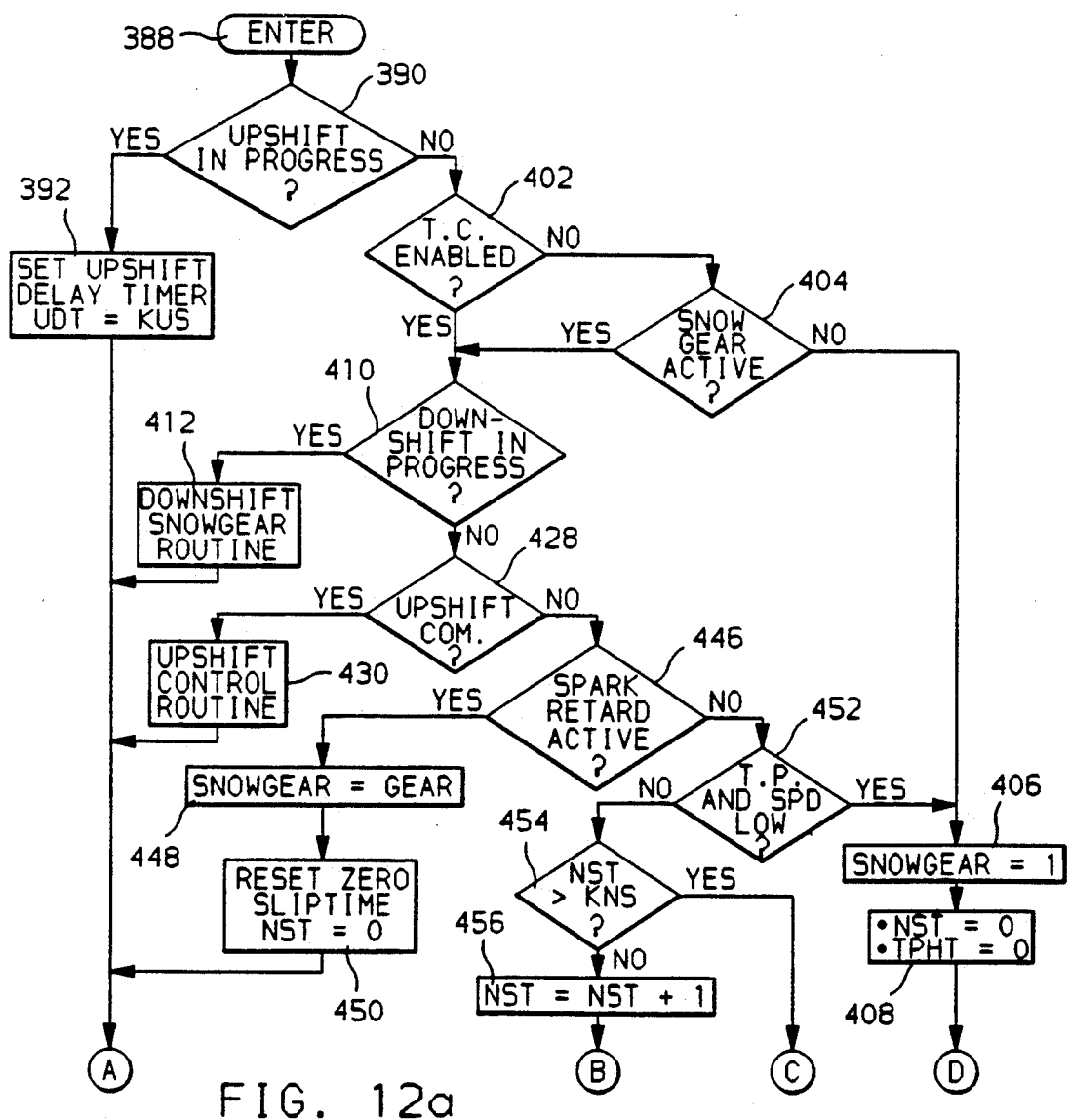
Figure 12B:
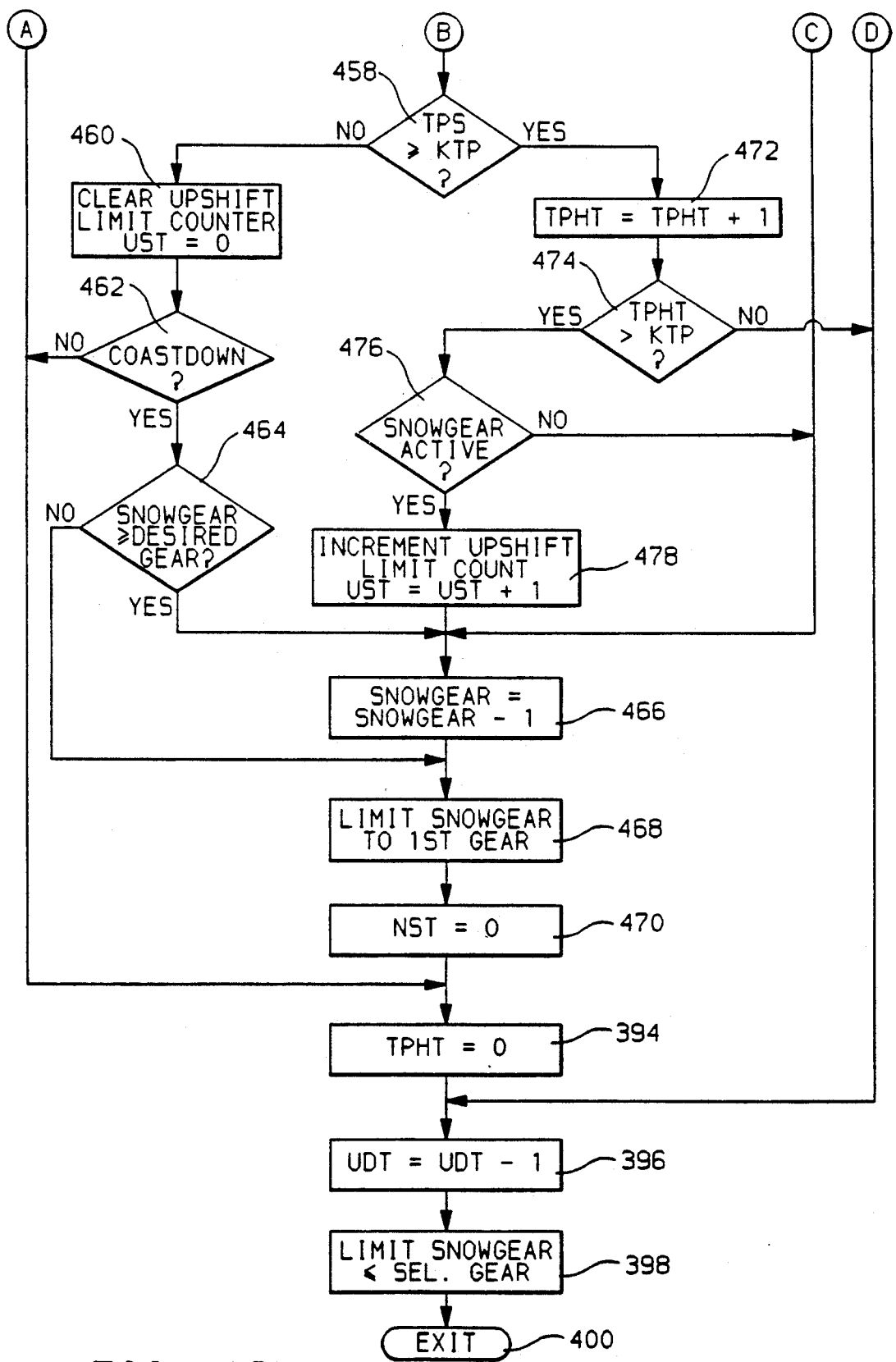

The traction control snowgear subroutine 382 is illustrated in FIG. 12. Referring to that FIGURE, the routine is entered at step 388 and then proceeds to a step 390 where the program determines if an upshift is currently in progress in the automatic transmission. Assuming first that an upshift is in progress, an upshift delay timer UDT is initialized to a calibration constant KUS. This constant represents a time delay imposed between upshifts of the transmission. This time prevents subsequent upshift events from occurring one on top of the other, allowing for the wheel slip to recover in the upshifted gear before another upshift is attempted.

From step 392, a throttle position high timer is reset to zero at a step 394 after which the upshift delay timer is decremented at step 396. The snowgear is then limited at step 398 to a value less than or equal to the gear selected by the vehicle operator. This step prevents the snowgear from causing an upshift to a gear higher than the gear selected by the vehicle operator. Thereafter, the routine returns to the main routine of FIG. 11 via step 400.

Returning to step 390, if an upshift is not in progress, the program proceeds to a step 402 where it is determined if traction control is enabled as represented by the position of the manual switch 62 of FIG. 1. Assuming first that the traction control is disabled, a step 404 determines whether or not the snowgear is active. A snowgear is considered active if the manual switch had been previously enabled and the transmission shift pattern had been modified so as to establish a snowgear other than the gear called for by the shift pattern. Assuming the snowgear is not active, the snowgear is initialized to first gear at step 406 after which a no-slip timer and the throttle position high timer are initialized to a reset condition at step 408. Thereafter the steps 396-400 are executed as previously described.

Figure 13:
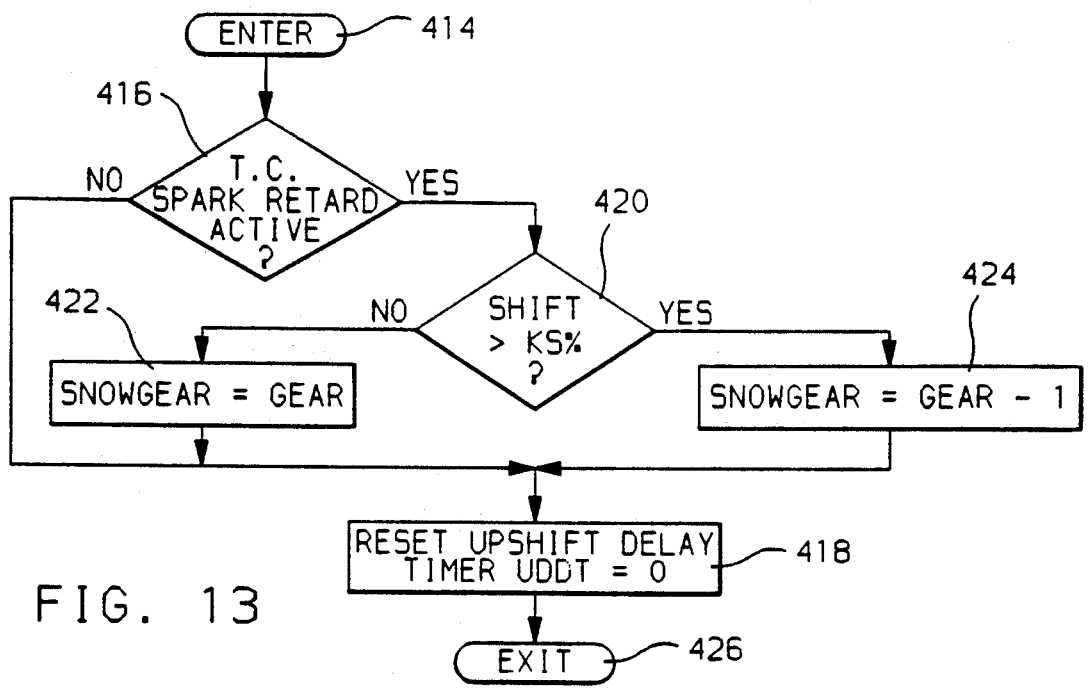

If the traction control is enabled or if step 404 determines that the snowgear is active, a step 410 determines if a downshift is in progress. Assuming initially that a downshift is in progress, a downshift subroutine 412 is executed as illustrated in FIG. 13. Given that traction spark retard is active, this routine controls the snowgear to inhibit the downshift if the shift is less than KS% complete. Referring to this FIGURE, the subroutine is entered at step 414 and proceeds to a step 416 where the routine determines if the traction control spark retard is active. This condition is represented by the condition of the traction control retard flag established by the execute flag logic subroutine 118 of FIG. 2. Assuming that traction control spark retard is not active, the upshift delay timer UDT is reset at step 418. However, if the spark retard is active indicating that the engine torque is being reduced for traction control, the program proceeds to a step 420 to determine if the downshift is greater than KS% complete. This step essentially determines if a downshift has just been initiated such as in response to a condition where the engine throttle has just been stepped open resulting in a downshift being initiated by the normal shift pattern control. Assuming that the shift is less than KS% complete, the snowgear is set equal to the present transmission gear ratio at step 422. This effectively inhibits the downshift that was initiated since the snowgear establishes the minimum gear ratio. However, if the downshift has been substantially completed as represented by the shift being greater than KS% complete, the program proceeds to set the snowgear at the present transmission gear ratio minus 1 at step 424. This effectively limits the downshift to a single gear since the transmission gear can never be reduced below the snowgear. From either the steps 422 and 424, the upshift delay timer is reset to zero as previously described at step 15 after which the routine returns to the traction control snowgear subroutine of FIG. 12 via step 426. Following the downshift snowgear subroutine 412, the steps 394-400 are executed as previously described.

Returning to step 410, if a downshift is not in progress, the program proceeds to a step 428 where the routine determines if the upshift command flag is set indicating a request to upshift the transmission for traction control. Assuming first that the upshift command flag is set indicating a request to upshift the transmission, an upshift control subroutine 430 is executed. This routine is illustrated in FIG. 14.

Figure 14:
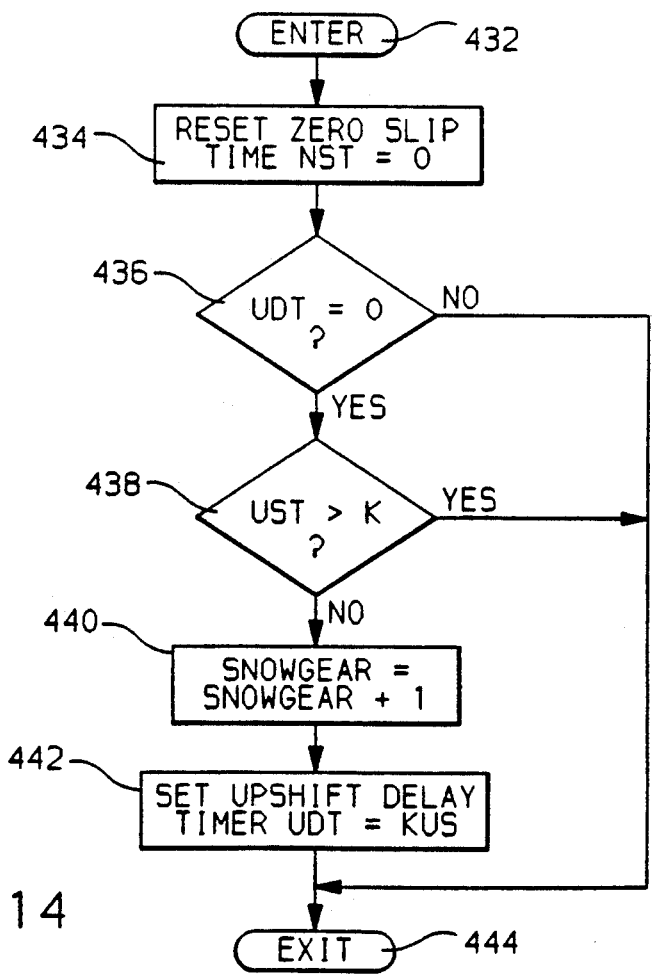

Referring to FIG. 14, the subroutine is entered at point 432 and proceeds to reset a zero slip timer NST equal to zero at step 434. This timer represents the time occurring with zero slip. The step 436 then determines if the minimum delay time KUS between upshifts has expired represented by the upshift delay time UDT being equal to zero. If not, the routine returns to the traction control snowgear subroutine of FIG. 12 via step 444. If, however, the minimum time between upshifts has expired so that another upshift is allowed, a step 438 determines if an upshift count exceeds the value K in this traction control event. K may be, for example, 3. If the number of upshifts has exceeded the value K as determined at step 438, the routine exits the upshift control routine without adjustment of the snowgear so as to prevent oscillation of the transmission gear ratios. However, if the number of upshifts in the present traction control event does not exceed the value K, the snowgear is incremented at step 440 to increase the minimum allowable gear to cause the transmission to be upshifted to the next higher gear. The upshift delay timer UDT is then reset to the calibration value KUS at step 442 to impose the time delay before the next upshift can be allowed. Thereafter, the routine returns to the traction control snowgear subroutine of FIG. 12 via step 444. Following the execution of the upshift control subroutine 430, the steps 394-400 are executed as previously described.

Returning to step 428, if the routine determines that the upshift command flag is reset indicating that an upshift is not being requested, a step 446 determines whether or not spark retard is active indicating that the engine torque output is being limited in response to an excessive spin condition. Assuming that the spark retard is active, a condition exists in which an excessive slip condition has occurred but a downshift has not been initiated in response to the acceleration condition. When this condition exists, it is desired to prevent the downshift. This is accomplished by setting the snowgear equal to the present transmission gear ratio at a step 448. Thereafter, the zero slip time NST is reset to zero at step 450 since the wheels are experiencing slip as indicated by spark retard being active. Thereafter, the steps 394-400 are executed as set forth above.

Returning to step 446, if the spark retard is not active indicating that engine torque is not being limited in response to an excessive slip condition, the routine proceeds to execute a series of steps to control the snowgear to enable the transmission to downshift to the selected gear. First, the routine determines if the throttle position and the vehicle speed are low. If this condition is sensed at step 452, the snowgear is immediately reset to first gear at step 406 after which the no-slip timer and the throttle position high timer are reset at step 408 as previously described. This enables the transmission gear to be shifted down to first gear according to the normal shift patterns.

If, however, step 452 determines the throttle position and vehicle speed are not low, the routine determines at step 454 the no-slip timer is greater than the calibration time KNS. If not, the no-slip timer is incremented at step 456. The routine then determines if it is reasonable to allow downshift of the transmission, keeping in mind that the spark retard is not active such that the engine torque is not being limited for traction control.

First the routine determines at step 458 if the throttle position is greater than a calibration constant KTP such as 50%. This throttle position is high enough such that the maximum torque in this gear is substantially developed by the engine. Assuming first that the throttle position is not greater than KTP, the upshift limit counter UST is cleared at step 460 after which the routine determines if the vehicle is in a coastdown mode at step 462. If not, steps 394-400 are executed as previously described. However, if the coastdown condition is determined by step 462, a step 464 determines if the snowgear is greater than or equal to the desired gear. If the snowgear is greater than or equal to the desired gear, the snowgear is decremented at step 466. The next step 468 limits the snowgear to first gear. At step 470, the no-slip timer is reset to zero.

Returning to step 458, if the throttle position sensor indicates the throttle position is greater than or equal to the calibration threshold KTP, the throttle position high timer is incremented at step 472. The throttle position high timer is then compared to a calibration threshold KTP at step 474. If the time period KTP has not expired, the program proceeds directly to step 396 where the upshift delay timer is decremented, followed by step 398 wherein the snowgear is limited to a gear less than or equal to the driver selected gear. Returning to step 474, if the throttle position high timer exceeds the time KTP, step 476 determines if the snowgear is active. Assuming that the snowgear is active, a step 478 increments the upshift limit count UST after which the snowgear is decremented at step 466. The routine then proceeds to step 468 and subsequent steps as previously described. Returning to step 476, if the snowgear is not active, step 478 incrementing the upshift limit count UST is bypassed. Returning to step 454, if there has been no slip for the time period KNS, the snowgear is decremented at step 466. In summary, the foregoing provides for downshift under conditions where the throttle position and vehicle speed are low, a time period KNS has expired without slip, a coastdown condition has been sensed, and a power-on condition has occurred for a predetermined time period with no slip.

Figure 15:
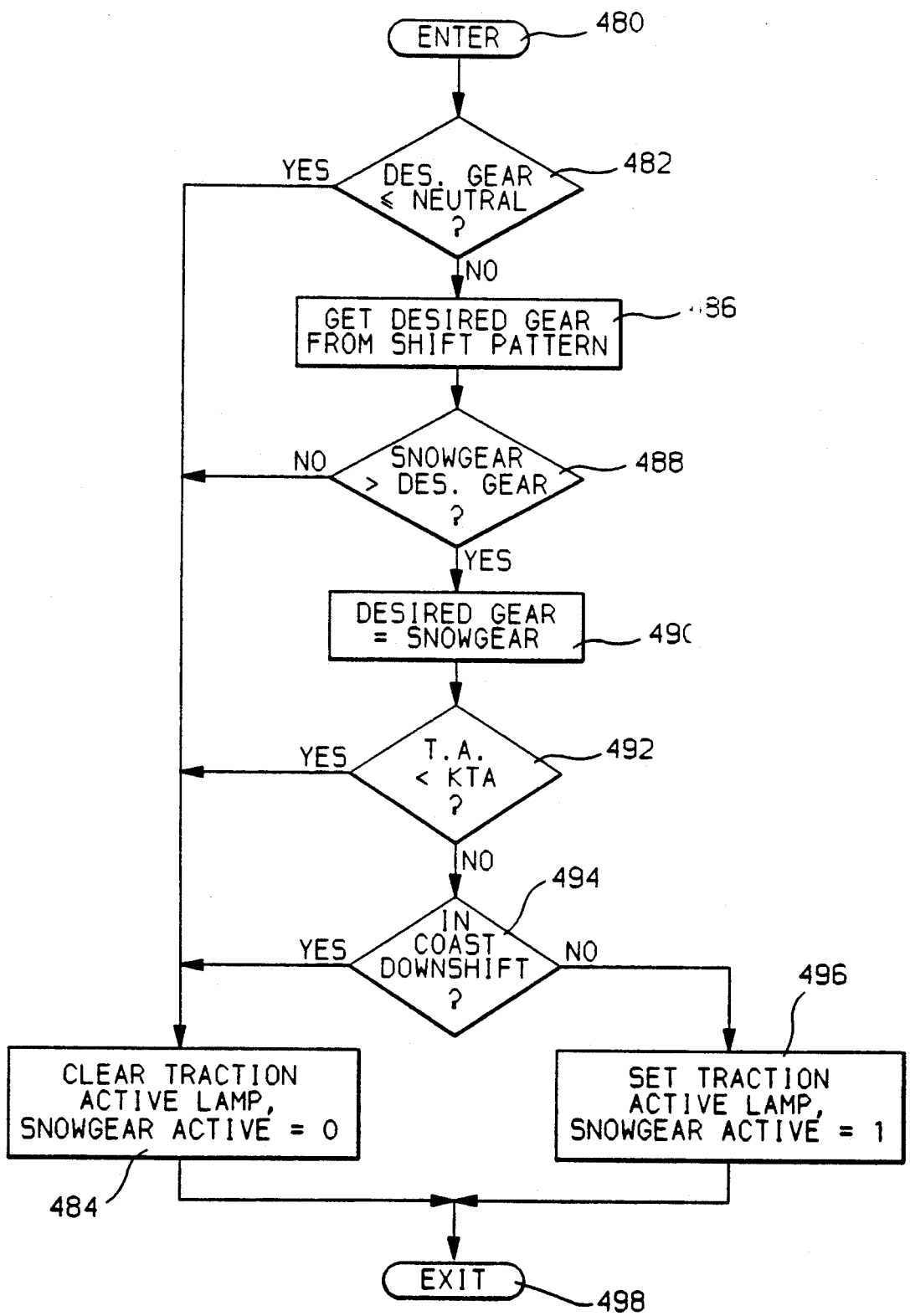

Referring to FIG. 15, the gear ratio selection subroutine 384 of FIG. 11 is illustrated. This routine is entered at point 480 where the routine first determines if the manually selected desired gear is less than or equal to neutral. If so, the traction active lamp is cleared and the snowgear active flag is set to zero at step 484. If the desired gear is in one of the forward gears, the step 486 is executed to determine the desired gear from the shift pattern stored in ROM in the transmission controller 46. This shift pattern establishes the desired gear ratio in response to parameters that may include engine load and vehicle speed. Thereafter, the snowgear is compared at step 488 to the desired gear obtained from the calibration shift pattern. If less than the desired gear, the program proceeds to the step 484 where the traction active lamp and the snowgear active flag are cleared. However, if the snowgear is greater than the desired gear indicating an upshift condition is required in order to increase the authority of the spark retard routine to limit excessive spin, the program proceeds to a step 490 where the desired gear is set equal to the snowgear established in the traction control snowgear subroutine 382 of FIG. 12. This gear is then commanded by the transmission control module to cause an upshift in the transmission gear.

If the throttle angle is less than the low threshold KTA or the vehicle is in a coast downshift condition, it is not desirable to energize the traction active lamp since a slip condition does not exist. Accordingly, if those conditions are sensed by the steps 492 and 494, the step 484 is executed to clear the traction active lamp and to clear the snowgear active flag. Otherwise, the program proceeds to execute the step 496 to set the traction active lamp and to set the snowgear active flag to indicate that the transmission is modifying the slip pattern in response to a request to assist in traction control. Thereafter, the program returns to the main loop of FIG. 11 via step 498.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A traction control system for a motor vehicle having wheels driven by an engine through an automatic transmission and an ignition system adapted to initiate combustion in various engine cylinders in accordance with a spark timing control signal supplied thereto in accordance with a spark timing value, the automatic transmission having a plurality of forward gear ratios varying from low to high, the system comprising, in combination:

means for determining slip of the driven wheels;

means responsive to the determined slip exceeding a desired wheel slip value for adjusting the spark timing value in a direction effecting a reduction of the engine torque output so as to restore the wheel slip to the desired wheel slip value;

means for upshifting the automatic transmission when the amount of adjustment of the spark timing value reaches a predetermined threshold value.

2. A traction control system for a motor vehicle having wheels driven by an engine through an automatic transmission, an ignition system adapted to initiate combustion in various engine cylinders in accordance with a spark timing control signal supplied thereto in accordance with a spark timing value, and a catalytic converter through which combustion exhaust gases from the engine are discharged to the atmosphere, the automatic transmission having a plurality of forward gear ratios varying from low to high, the system comprising, in combination:

means for determining slip of the driven wheels;

means for determining the temperature of the catalytic converter;

means responsive to the determined slip exceeding a desired wheel slip value for adjusting the spark timing value in a direction effecting a reduction of the engine torque output so as to restore the wheel slip to the desired wheel slip value;

means for upshifting the automatic transmission when the amount of adjustment of the spark timing value reaches a threshold value that is a predetermined function of the determined temperature of the catalytic converter.

3. A traction control system for a motor vehicle having wheels driven by an engine through an automatic transmission, a fuel control system for delivering a quantity of fuel to various engine cylinders, and an ignition system adapted to initiate combustion in the various engine cylinders in accordance with a spark timing control signal supplied thereto in accordance with a spark timing value, the automatic transmission having a plurality of forward gear ratios varying from low to high, he system comprising, in combination:

means for determining slip of the driven wheels;

means responsive to the determined slip exceeding a desired wheel slip value for adjusting the spark timing value in a direction effecting a reduction of the engine torque output so as to restore the wheel slip to the desired wheel slip value;

means for upshifting the automatic transmission when the amount of adjustment of the spark timing value reaches a predetermined threshold value less than an authority limit value; and means for reducing the delivered fuel quantity when the amount of adjustment of the spark timing value reaches the authority limit value.

4. A traction control system for a motor vehicle having wheels driven by an engine through an automatic transmission, a fuel control system for delivering a quantity of fuel to various engine cylinders, an ignition system adapted to initiate combustion in the various engine cylinders in accordance with a spark timing control signal supplied thereto in accordance with a spark timing value, and a catalytic converter through which combustion exhaust gases from the engine are discharged to the atmosphere, the automatic transmission having a plurality of forward gear ratios varying from low to high, the system comprising, in combination:

means for determining slip of the driven wheels;

means for determining the temperature of the catalytic converter;

means responsive to the determined slip exceeding a desired wheel slip value for adjusting the spark timing value in a direction effecting a reduction of the engine torque output so as to restore the wheel slip to the desired wheel slip value;

means for upshifting the automatic transmission when the amount of adjustment of the spark timing value reaches a predetermined threshold value less than an authority limit value that is a predetermined function of the determined temperature of the catalytic converter; and means for reducing the delivered fuel quantity when the amount of adjustment of the spark timing value reaches the authority limit value.

* * * * *